United States Patent [19]
Cohen et al.

[11] Patent Number: 6,040,841
[45] Date of Patent: Mar. 21, 2000

[54] METHOD AND SYSTEM FOR VIRTUAL CINEMATOGRAPHY

[75] Inventors: Michael F. Cohen; Li-wei He; David H. Salesin, all of Seattle, Wash.

[73] Assignee: Microsoft Corporation, Redmond, Wash.

[21] Appl. No.: 08/691,996

[22] Filed: Aug. 2, 1996

[51] Int. Cl.[7] .................................................. G06T 15/70
[52] U.S. Cl. ............................................ 345/473; 345/474
[58] Field of Search .................................... 345/427, 355, 345/419, 302, 473–475, 328

[56] References Cited

U.S. PATENT DOCUMENTS

| | | |
|---|---|---|
| 5,479,597 | 12/1995 | Fellous . |
| 5,524,195 | 6/1996 | Clanton, III et al. . |
| 5,611,025 | 3/1997 | Lorensen et al. . |
| 5,644,694 | 7/1997 | Appleton . |
| 5,659,323 | 8/1997 | Taylor . |
| 5,745,126 | 4/1998 | Jain et al. . |

OTHER PUBLICATIONS

Wagstaff, "Apple Media Tool makes authoring easy, flexible", MacWeek, v10 n12, pp. 29(2), Mar. 25, 1996.

Szeliski, "Video Mosaics for Virtual Environments", IEEE Computer Graphics and Applications Magazine, v16 n2, pp. 22–30, Mar. 1996.

Kanade, et al., "Virtualized Reality: Concepts and Early Results", O–8186–7122–X/95, IEEE, pp. 69–76, 1995.

"IBM 3D Virutal Reality Program Lets Olympic Officials 'Walk Through' Planned and Partially Built Sports Venues", www.research.ibm.com/3dix/acog/pressrelease.html, Jun. 1995.

Davenport et al, "Cinematic Primitives for Multimedia", IEEE Computer Graphics and Applications, v11 n4, pp. 67–74, Jul. 1991.

Karney, "Awesome Animated Monster Maker and Microsoft 3D Movie Maker", Computer Shopper, v16 n5, p. 270, May 1996.

Moezzi et al., "Immersive Video," *Proceedings of VRAIS '96*, Jan. 1996, pp. 17–24.

Daniel Arijon, *Grammar of the Film Language*, Hastings House, Publishers, New York, 1976, pp. 100–101.

Steven M. Drucker et al., "Cinema: A System for Procedural Camera Movements," *Computer Graphics (1992 Symposium on Interactive 3D Graphics)*, Mar. 1992, vol. 25, pp. 67–70.

Steven M. Drucker and David Zelter, "Intelligent Camera Control In a Virtual Environment," *Proc. of Graphics Interface'94*, May 1994, pp. 190–199.

(List continued on next page.)

*Primary Examiner*—Joseph H. Feild
*Attorney, Agent, or Firm*—Klarquist Sparkman Campbell Leigh & Whinston

[57] ABSTRACT

Communication in a three-dimensional virtual environment generated by a computer is achieved by automatically applying rules of cinematography typically used for motion pictures. The cinematographic rules are codified as a hierarchical finite state machine, which is executed in real-time by a computer in response to input stimulation from a user or other source. The finite state machine controls camera placements automatically for a virtual environment. The finite state machine also exerts subtle influences on the positions and actions of virtual actors, in the same way that a director might stage real actors to compose a better shot. An implementation of a real-time camera controller based on the finite state machine for automatic virtual cinematography, called the virtual cinematographic application module (VC) is presented. The VC is used in virtual reality and other interactive applications to improve upon the fixed point-of-view shots or ceiling mounted cameras that such applications typically employ today. VC also helps improve the next generation of "intelligent-agent" user interfaces, by allowing the users to see themselves with an agent at camera positions that appear natural.

31 Claims, 17 Drawing Sheets

OTHER PUBLICATIONS

Michael Gleicher and Andrew Witkin, "Through-the-Lens Camera Control," *Computer Graphics*, Jul. 1992, vol. 26, No. 2, pp. 331–340.

Peter Karp and Steven Feiner, "Automated Presentation Planning of Animation Using Task Decomposition with Heuristic Reasoning," *Proc. of Graphics Interface '93*, May 1993, pp. 118–127.

Warren Sack and Marc Davis, "IDIC: Assembling Video Sequences from Story Plans and Content Annotations," In *IEEE International Conference on Multimedia Computing and Systems*, May. 1994, pp. 30–36.

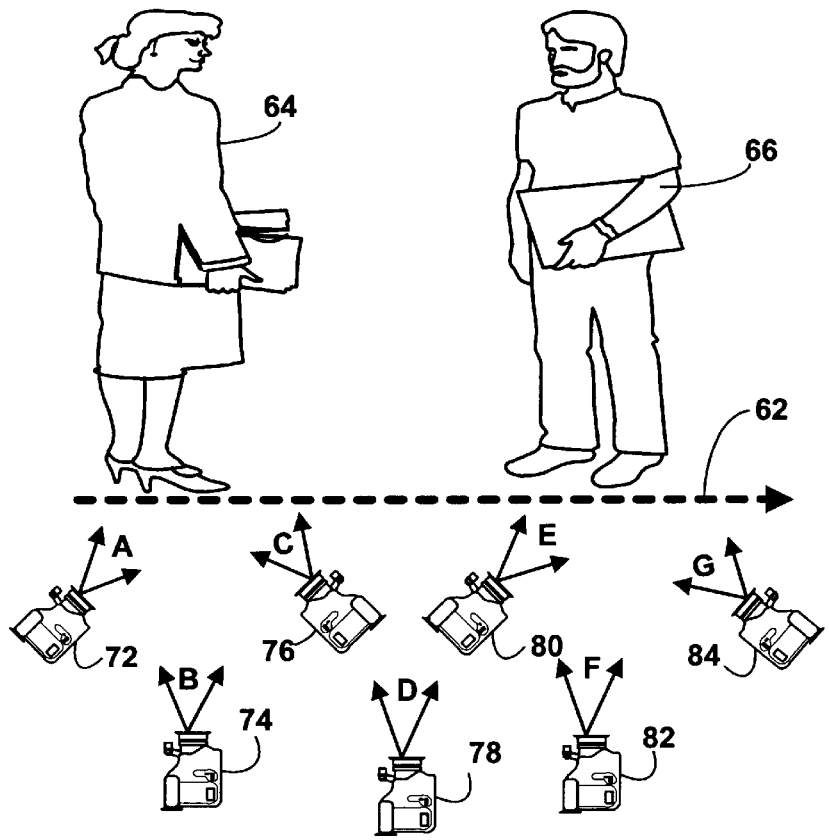
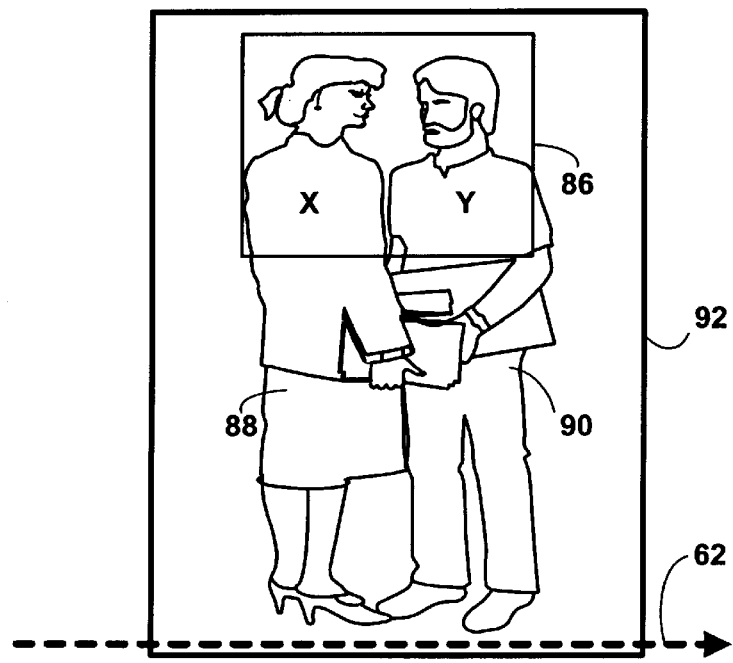

CLOSEAPEX( )

APEX3( )

EXTERNAL( )

EXTERNAL1TO2( )

EXCLOSE2( )

INTERNAL( )

FULL( )

TRACKING( )

PANNING( )

FIG. 22
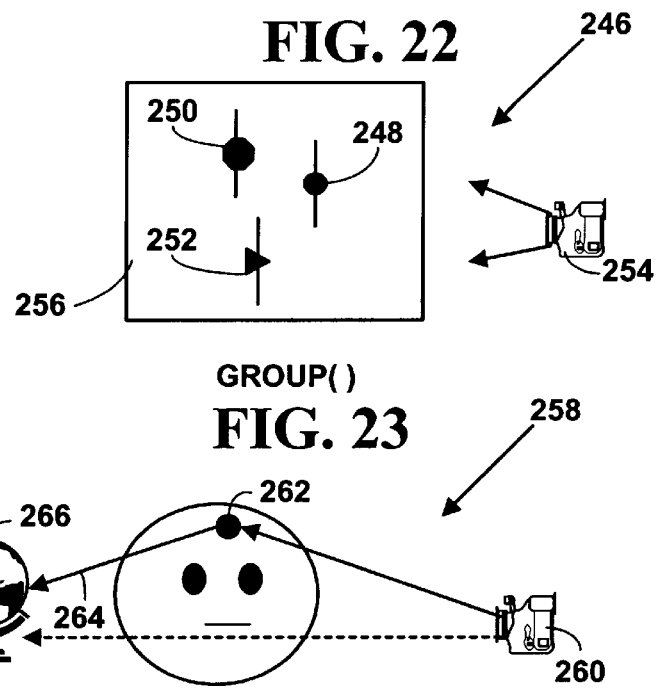
GROUP( )
FIG. 23
SUBJECTIVE( )
FIG. 24
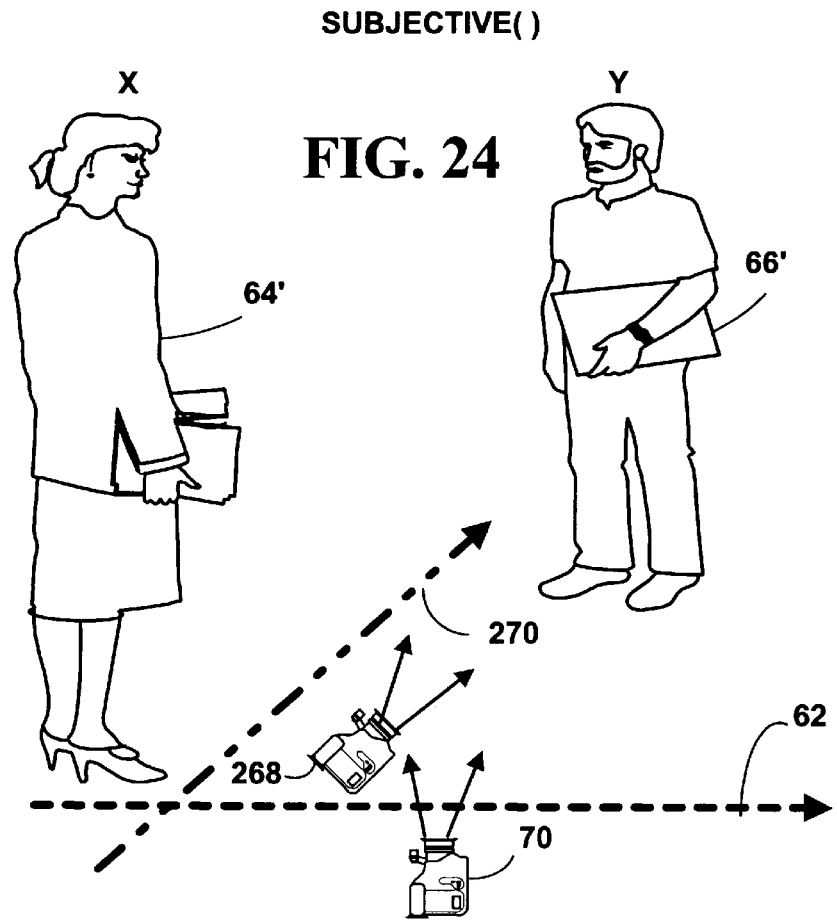

2TALK IDIOM

3TALK IDIOM

METHOD AND SYSTEM FOR VIRTUAL CINEMATOGRAPHY

A portion of the disclosure of this patent document contains material which is subject to copyright protection. The copyright owner has no objection to the facsimile reproduction by anyone of the patent document or patent disclosure, as it appears in the Patent and Trademark Office patent files or records, but otherwise reserves all copyright rights whatsoever.

FIELD OF INVENTION

The present invention relates to computer animation. More particularly, the present invention relates to generating specifications for displaying events in virtual three-dimensional computer animated environments.

BACKGROUND AND SUMMARY OF THE INVENTION

The explosive growth of the computer networks like the Internet has provided a convenient way for computer users to obtain from remote sites information in the form of text, graphics, and audio and video segments. A computer connected to the Internet or other computer network (e.g., internet) can also be utilized by a computer user to interact in real-time with other computer users connected to the computer network. For example, a computer user may participate in an animated computer video game with a remote computer user. Some of these animated computer video games utilize a computer-generated virtual three-dimensional (3D) environment in which the computer user controls animated virtual characters.

Also of increasing popularity are virtual 3D chat environments, in which computer users interact with each other through animated 3D virtual actors (sometimes called avatars) that are controlled by and represent the computer users. In this type of chat environment, for example, each computer user is provided a 3D display of a room in which the virtual actors or avatars are rendered according to which users are communicating with each other. The arrangement and positioning of the virtual actors provide the computer users with a 3D display indicating which computer users are communicating with each other. This type of graphical indication is not possible in a conventional chat environment that uses text as a communication interface.

This form of communication within a virtual 3D environment, while holding much promise, also has a number of associated problems. For example, users often have difficulty comprehending and navigating the virtual 3D environment, locating in the simulated environment virtual actors of computer users with whom they wish to communicate, and arranging their actors in such a way that all the users conversing together can see each other's actors.

These types of problems are similar to the problems that have been faced by cinematographers since filmmaking began a century ago. Over the years, filmmakers have developed conventions or rules of film that allow actions to be communicated comprehensibly and effectively. These rules of film, although rarely stated explicitly, are so common that they are taken for granted and well understood by audiences. These cinematography conventions or rules of film utilize camera positions, scene structure, and "inter-shot" consistency rules to convey cinematographic information. For example, audiences understand well a scene that begins with a high elevation view of a landscape and passes to a lower elevation view of the landscape dominated by a roadway and an automobile, and then a close-up of a person in an automobile.

Cinematography conventions or rules of film for controlling camera positions and scene structure have received relatively little attention in the computer graphics community. A number of computer animation systems attempt to apply some cinematographic principles to computer graphics in limited applications including: an animation planning system using off-line planning of didactic presentations to explain complex tasks; the creation of semi-autonomous actors who respond to natural language commands; and the assembling of short sequences of video clips from a library of video footage. However, these systems typically pay little or no attention to camera placement or inter-shot consistency rules (e.g., it would appear inconsistent for an actor who exits a scene to the left of a frame to re-enter it from the right).

Some interactive animation systems have been described for finding the best camera placement when interactive tasks are performed. But these systems neither attempt to create sequences of scenes, nor do they apply rules of cinematography in developing their specifications.

Automating cinematographic principles for a 3D virtual application executed by a computer presents difficult problems not found in conventional film making. While informal descriptions of various rules of cinematography are mentioned in a variety of texts, they typically have not been defined explicitly enough to be expressed in a formal language capable of execution by a computer. In addition, performing automatic image or "camera" control in real-time on a computer imposes constraints that are more difficult to overcome than those faced by human directors. Human directors typically work from a script that is agreed upon in advance and can edit the raw footage off-line at a later time. This is not possible for an interactive 3D computer application executed in real-time.

In accordance with the present invention, the problems with automating cinematographic principles are overcome. The present invention includes a virtual cinematography method for capturing or rendering events in virtual 3D environments in accordance with the automated cinematographic principles. The method includes accepting a description of events that have occurred within a specified time period (e.g., one computer clock tick). Events are typically in a selected form such as (subject, verb, object). For example, a (B, talk, A) event means that virtual actor B is talking to virtual actor A. The accepted events are interpreted to produce an appropriate camera specification which is used to view the virtual actors.

The method uses two main components: camera modules and cinematographic idioms. The camera modules are responsible for the low level geometric placement of specific cameras in a scene and for making subtle changes in the positions of virtual actor to best frame each camera shot. The cinematographic idioms describe the cinematographic logic used for combing camera shots into sequences (e.g., animation sequences). The camera modules and the cinematographic idioms are used together to create virtual films and animations.

The method is used to implement a real-time camera controller based on a finite state machine for automatic virtual cinematography, called a virtual cinematographic application module (VC). The VC is used in virtual reality and other interactive applications to improve upon the fixed point-of-view shots or ceiling mounted cameras that such applications typically employ. VC also helps improve "intelligent-agent" user interfaces by allowing the users to see themselves with an agent at camera positions that appear natural.

The foregoing and other features and advantages of the present invention will be more readily apparent from the following detailed description, which proceeds with reference to the accompanying drawings.

BRIEF DESCRIPTION OF THE DRAWINGS

FIG. 5 is a block diagram illustrating camera positions for film cinematography.

FIG. 6 is a block diagram illustrating close view and full view camera shot.

FIG. 22 is a block diagram illustrating the group camera module.

FIG. 23 is a block diagram illustrating the subjective camera module.

FIG. 24 is a block diagram illustrating a change in the position of "the Line."

DETAILED DESCRIPTION OF A PREFERRED EMBODIMENT

Figure 1:
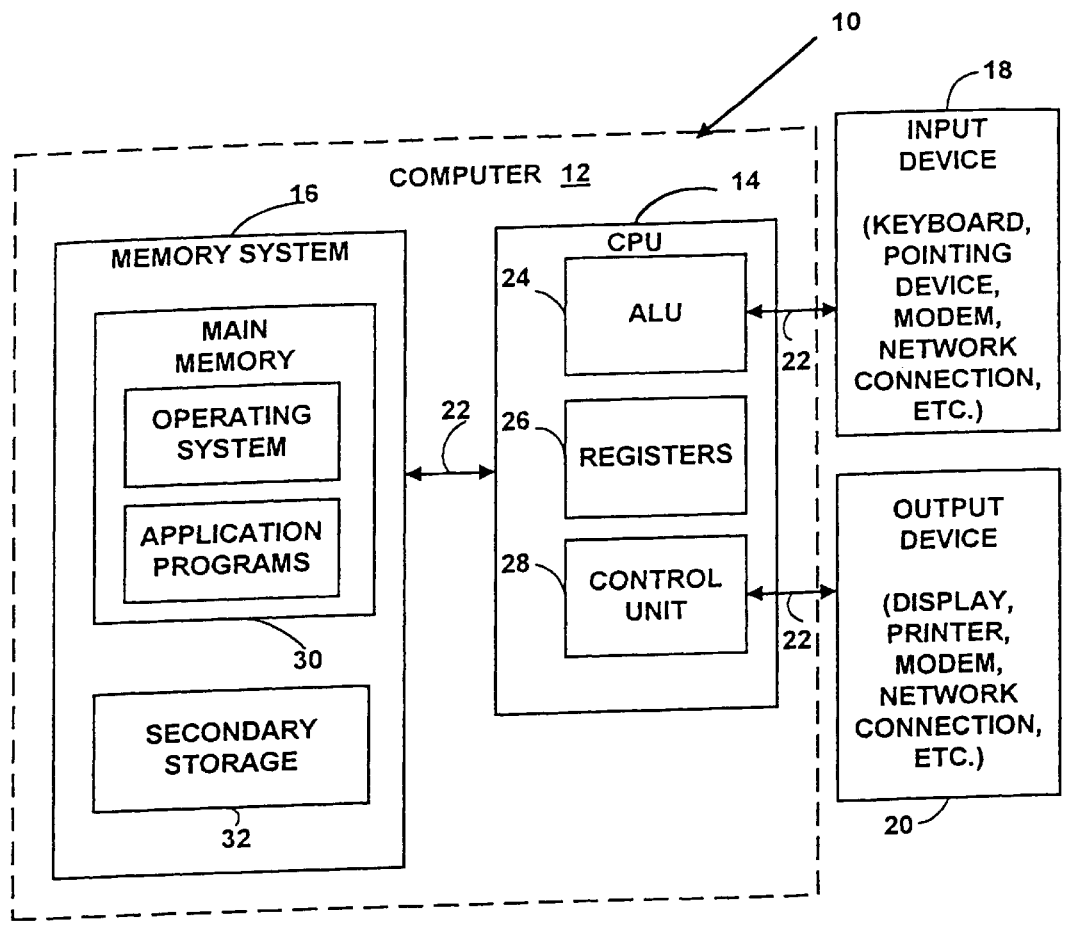
FIG. 1 is a block diagram of a computer system used to implement an exemplary embodiment of the present invention.

Referring to FIG. 1, an operating environment for an exemplary embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, audio device (e.g., a microphone, etc.), or any other device providing input to the computer system 10. The output device 20 can comprise a display, a printer, an audio device (e.g., a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is a set of software which controls the computer system's operation and the allocation of resources. The application program is a set of software that performs a task desired by the user, making use of computer resources made available through the operating system. Both are resident in the illustrated memory system 16. In accordance with the practices of persons skilled in the art of computer programming, the present invention is described below with reference to acts and symbolic representations of operations that are performed by computer system 10, unless indicated otherwise. Such acts and operations are sometimes referred to as being computer-executed. It will be appreciated that the acts and symbolically represented operations include the manipulation by the CPU 14 of electrical signals representing data bits which causes a resulting transformation or reduction of the electrical signal representation, and the maintenance of data bits at memory locations in memory system 16 to thereby reconfigure or otherwise alter the computer system's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, and any other volatile or non-volatile mass storage system readable by the computer 12. The computer readable medium includes cooperating or interconnected computer readable media, which exist exclusively on computer system 10 or are distributed among multiple interconnected computer systems 10 that may be local or remote.

Figure 2:
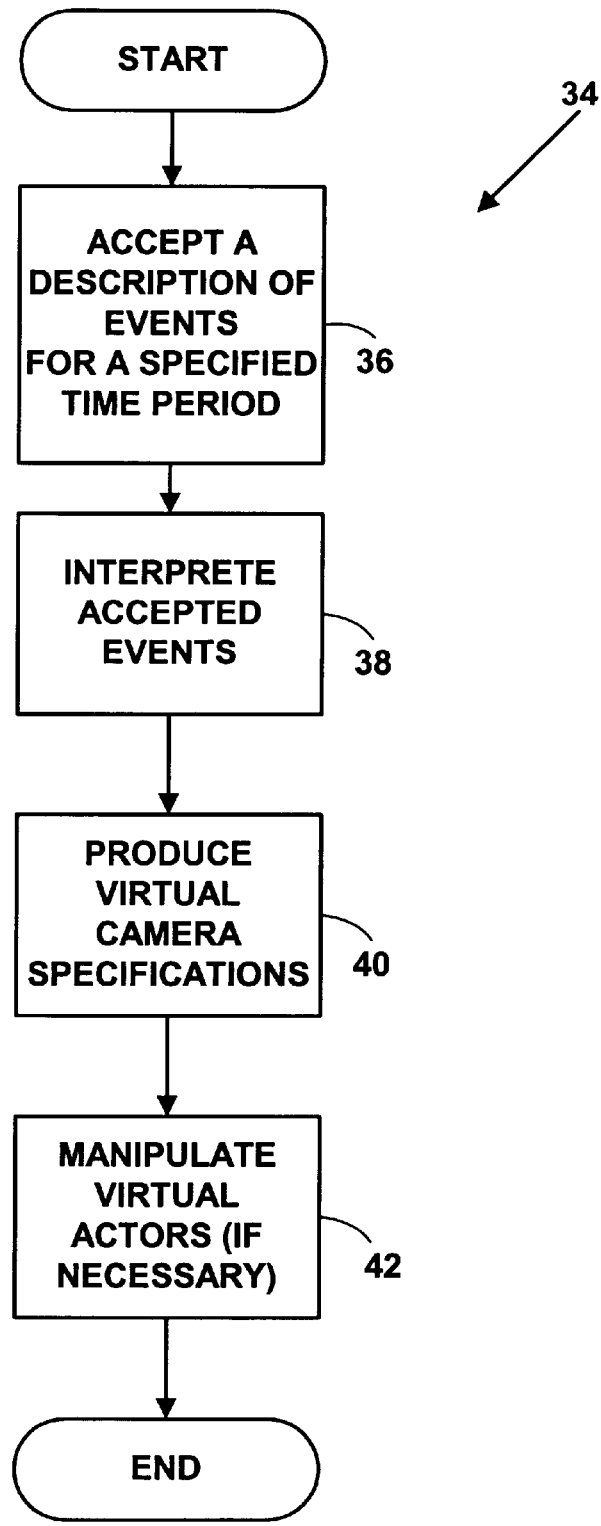
FIG. 2 is a flow diagram illustrating a method for one embodiment of the present invention.

As is shown in FIG. 2, an exemplary embodiment of the present invention includes a virtual cinematography method 34 for rendering computer-generated scenes in virtual 3D environments. Such a virtual 3D environment represents a 3D image space within which display images of virtual objects or characters are generated by a computer and rendered on a display screen. The cinematography is "virtual" in that images formed not with cameras but rather according to computer-generated viewing directions, magnifications, etc.

The method 34 includes accepting a description of events that occur in a specified time period 36 (e.g., one computer clock tick). Events are typically represented by a selected form such as (subject, verb, object). For example, a (B, talk, A) event means that virtual actor B will talk to virtual actor A. The events are interpreted 38, to produce an appropriate virtual camera specification 40. Acting hints that are also generated to shift the virtual actors to better frame a short.

Figure 3:
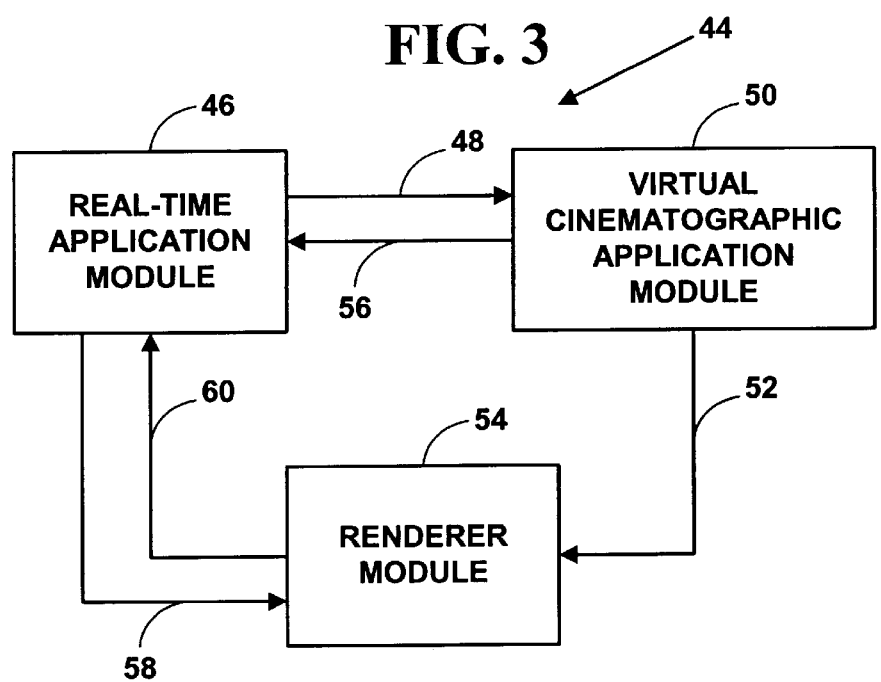
FIG. 3 is a block diagram of a system for the present invention.

FIG. 3 illustrates a system 44 for an exemplary embodiment of the present invention. The system 44 includes a real-time application module 46 (e.g., a multi-user chat application, a computer video game, a video conferencing application, a virtual reality application, etc.) which provides a description of events and other information 48 including static geometric information, material properties (e.g., texture and shading) and light source placement, to a virtual cinematographic application module 50. The virtual cinematographic application module 50 implements the method 34 for virtual cinematography and sends virtual camera information and virtual actor manipulation information 52 to a renderer module 54. The virtual cinematographic application module 50 also can make queries 56 for information (e.g., the position of a virtual actor) from the real-time application module 46. The renderer module 54 includes graphic and animation software such as Direct3D available from Microsoft Corporation of Redmond, Wash. However, other renderer software could also be used. The renderer module 54 accepts animation parameters 58 (e.g., static geometry information, virtual actor models, lighting placement, etc.) from the real-time application module 46.

At designated time intervals (e.g., a clock tick), the real-time application module 46 is also responsible for taking input from a user, moving virtual actors appropriately, and sending the resulting animation information 60 (e.g., virtual actor positions) back to the renderer module 54. In addition, at the designated time intervals, the virtual cinematographic application module 50 decides on the specification of the virtual camera from which the virtual environment is rendered. The virtual cinematographic application module 50 also makes slight modifications to the arrangement and actions of the virtual actors if necessary.

Film cinematography

A motion picture or film is typically a sequence of multiple scenes, each of which captures a generally continuous situation or action. Each scene, in turn, is composed of one or more camera shots. A camera shot is a motion picture segment formed by continuous operation of the camera. Typically, a film includes a large number of individual camera shots, with each shot typically lasting from a second or two to tens of seconds.

Figure 4:
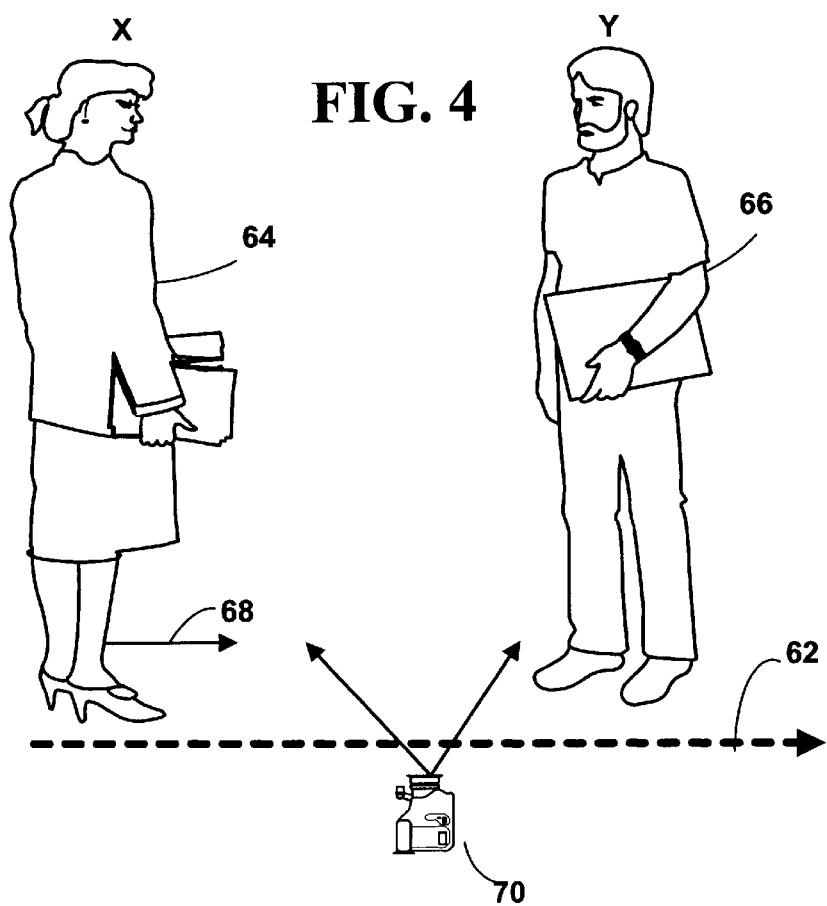
FIG. 4 is a block diagram illustrating the concept of "the Line."

FIG. 4 illustrates a cinematography convention or rule of film used in most motion pictures. In particular, film directors specify camera placements relative to a "Line" 62, which is an imaginary vector connecting two interacting actors X 64 and Y 66. The Line 62 is also directed along the line of an actor's motion 68 or oriented in the direction the actor is facing. Camera placement 70 is specified relative to the Line 62.

As is shown in FIG. 5 with respect to the Line 62, shooting actor Y 66 from camera position A 72 is called an "external reverse placement"; the right two-thirds of actor Y 66 are in focus while the left one-third shows the back side of the head of actor X 64. Shooting actor X 64 from camera position B 74 is called a "parallel camera placement" which shows only actor X 64. Shooting actor X 64 from position C 76 yields an "internal reverse placement." Typically, in camera setup C 76, actor X 64 occupies only the left two-thirds of the shot. Shooting from position D 78 results in an "apex placement" shot that shows both actors X 64 and Y 66. Shooting from position E 80 yields an "internal reverse placement" for actor Y 66. Shooting from position F 82 yields a "parallel camera placement" for actor Y 66. Finally, shooting from 84 is called an "external reverse placement"; the left two-thirds of the shot shows actor X 64 in focus while the right one-third shows the back side of the head of actor Y 66. However, more or fewer camera positions could also be used by a film director.

Cinematographers have identified that certain "cutting heights" make for pleasing compositions while others yield un-pleasing results (e.g., an image of an actor cut off at the ankles is not pleasing). There are five useful camera distances typically used in the art: (1) an extreme closeup view, cut at the neck; (2) a closeup view, cut under the chest or at the waist; (3) a medium view, cut at the crotch or under the knees; (4) a full view, that shows the entire actor, and (5) a long view, that provides a distant perspective of the actor.

Using the cutting heights, actor positions that look natural for a particular closeup may appear too close together when viewed from further back. Individual shots also require subtly different placement of actors for them to look natural on the screen. For example, as is shown in FIG. 6, a closeup view 86 of actor X 88 and another actor Y 90 with respect to the Line 62 looks perfectly natural. However, a full view 92 shows actors X 88 and Y 90 are closer together than expected, and thus, the full view 92 is unpleasing.

Figure 7A:
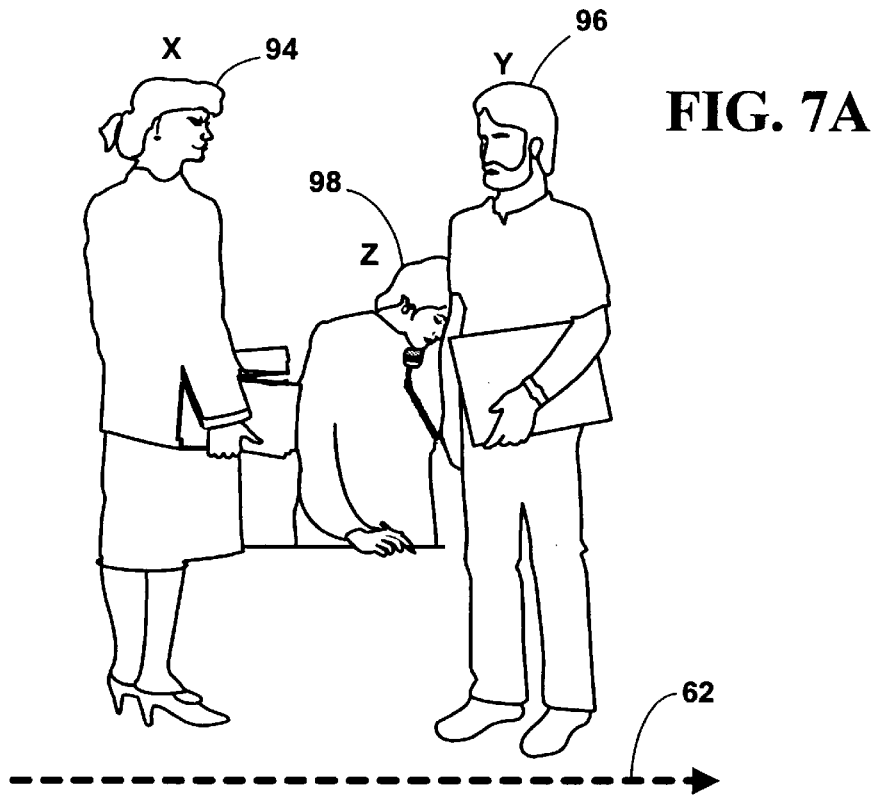
FIGS. 7A and 7B are block diagrams illustrating the arrangement of three actors in a camera shot.
Figure 7B:
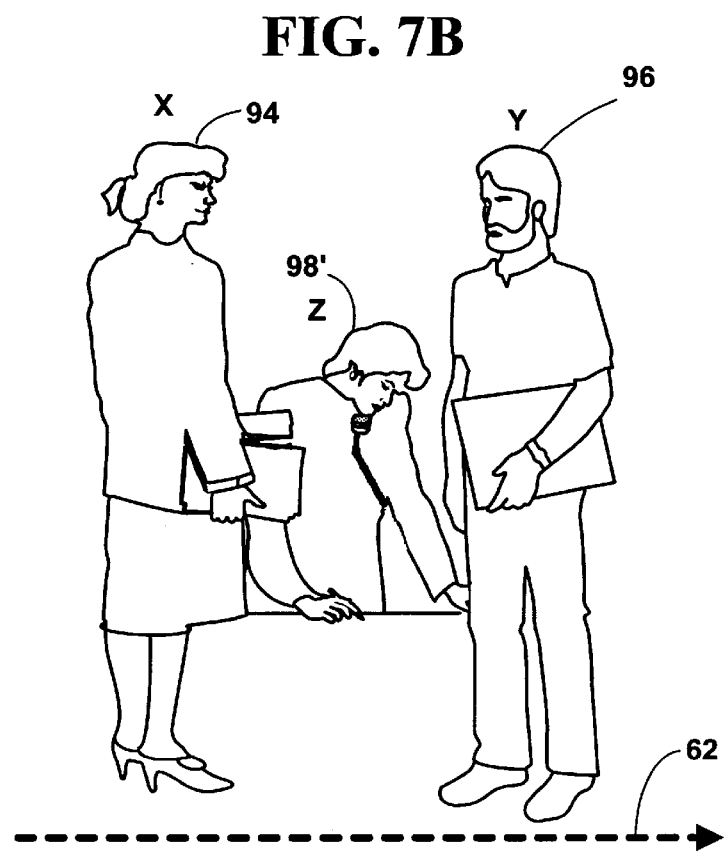

Similarly, shots with multiple actors often require shifting the actor positions to properly frame them. As is shown in FIG. 7A, with respect to the Line 62, a first actor X 94 and a second actor Y 96 partially hide or obstruct a third actor Z 98. Shifting the position of the third actor Z 98 will properly frame the shot to include the third actor Z 98. As is shown in FIG. 7B, the first actor X 94 and second actor Y 96 remain in the same positions, however the third actor Z 98' has been shifted. However, the positions of the first actor X 94 and second actor Y 96 could have also been shifted, leaving the third actor Z 98 in her original position to achieve the same result.

Film cinematographic heuristics

Filmmakers have articulated numerous heuristics (i.e., rules) for selecting good shots and have informally specified constraints to be placed on successive shots to create good scenes. The more important heuristics include: "Don't cross the Line;" "Avoid jump cuts;" "Use establishing shots;" "Let the actor lead;" "Break movement;" and "Maintain continuous movement." However, more or fewer heuristics could also be used.

The "Don't cross the Line" rule ensures that successive shots of a moving actor maintain the direction of apparent motion. Once an initial shot is taken from one side of the Line 62, as shown in FIG. 5, subsequent shots should also be made from that side, unless a neutral establishing shot is used to show the transition to the other side. Motion of actor Y 66 to the right of FIG. 5 would appear to be to the left for a camera on the other side of the Line 62.

A change in camera shot within a scene (i.e., a cut) should be a marked difference in the size, view, or number of actors between the two shots to "Avoid jump cuts." A cut that fails to meet these conditions is known as a jump cut and generally gives a jerky, sloppy effect.

The rule "Use establishing shots" establishes a background scene before moving to close shots. If there is a new development in the scene, the altered background situation is re-established. "Let the actor lead" allows an actor to initiate all movement, with the camera following. The camera comes to rest a little before the actor.

For the "Break movement" rule, a scene illustrating motion is broken into at least two shots. Typically, each shot is cut so that the actor appears to move across half the screen area. A change of the camera-to-subject distance is be made in the switch.

The "Maintain continuous movement" rule states that across a cut the apparent speed of the object in motion should be constant, and the directions of movement are not opposed.

Sequences of camera shots

Cinematographers use formulas for capturing specific actions as sequences of shots. For example, in a dialogue among three actors, a filmmaker might begin with an establishing shot of all three people, before moving to an external reverse shot of two of the actors as they converse, interspersing occasional reaction shots of the third actor. Books such as D. Arijon, *Grammar of the Film Language,* Hasting House, New York, 1976, provide an informal compilation of formulas, along with a discussion of the situations when a filmmaker might prefer one formula over another.

Figure 8:
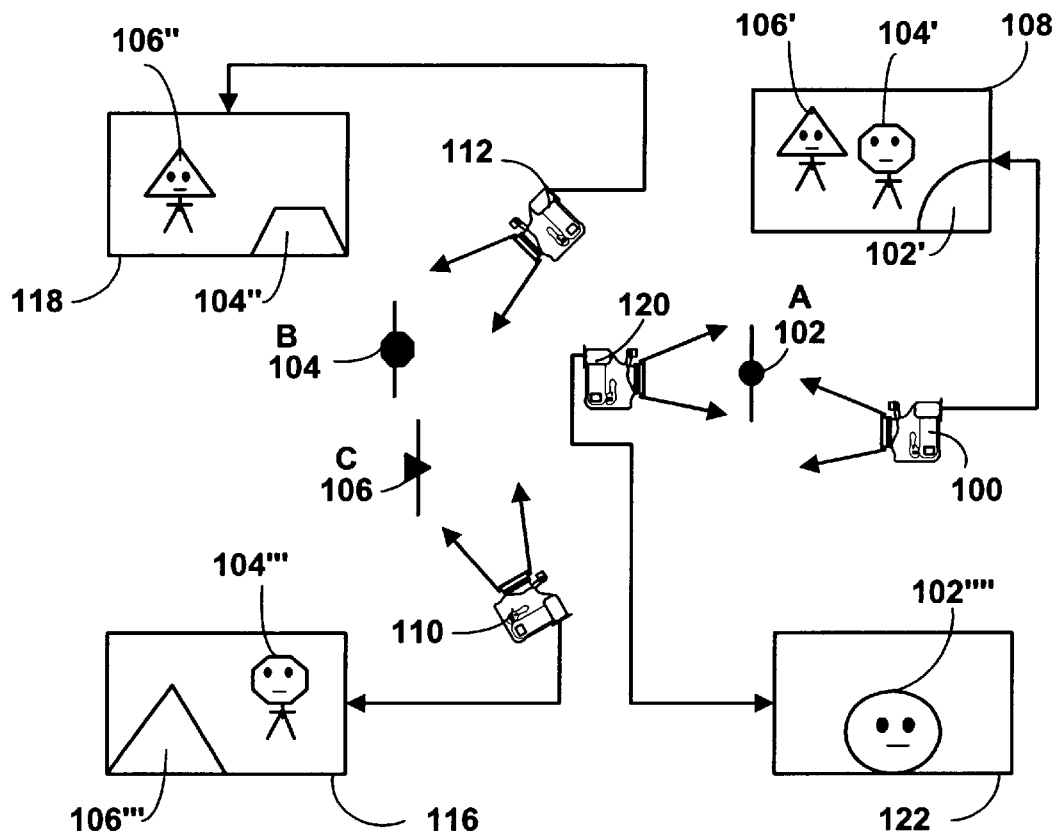
FIG. 8 is a block diagram illustrating camera shots used for three conversing actors.

FIG. 8 illustrates a common formula for depicting a conversation among three actors. The formula, adapted from FIG. 6.29 of D. Arijon's book, provides a method for depicting conversations among three actors. The first shot is an external reverse shot 100 over the shoulder of actor A 102 (round head) toward actor B 104 (octagon head) and actor C 106 (triangle head). A view of the external reverse shot 100 is illustrated in box 108 (actors B 104' and C 106' and the back of actor's A 102' head).

Second shot 110 and third shot 112 are external reverse shots of actors B 104 and C 106. Views of these shots are shown in boxes 116 and 118, respectively. External reverse shot 110 shows in box 116 the left two-thirds of the back of the head of actor C 106'" (triangle head) and right one-third of actor B 104'" (octagon head). External reverse shot 112 shows in box 118 the right two-thirds of the head actor B 104'" and the left one-third of actor C 106'". The fourth shot 120 is an internal reverse reaction shot of actor A 102"". A view of this shot 120 is shown in box 122. Only the front of the head of actor A 102"" is shown since there are no other actors "behind" actor A 102"". The back of the head is not shown since this an internal reverse reaction shot).

In his book, Arijon stipulates that an editing order for a typical sequence using this setup would be to alternate between the first shot 100 (box 108) and fourth shot 120 (box 122) while actors B 104 and C 106 talk to actor A 102. When actors B 104 and C 106 begin to talk to each other, the sequence shifts to an alternation between the second shot 110 (box 116) and the third shot 112 (box 118), with an occasional reaction shot 120 (box 122). Shot 100 is introduced periodically (e.g., every 15 seconds) to re-establish the whole group.

While there is a wide variety of formulas for putting shots together in a sequence, each film director tends to rely on a small subset of the formulas. The particular formulas used by any individual director lend a certain flavor or style to that director's films. In an exemplary embodiment of the present invention, director style is dictated by the particular formulas encoded in the virtual cinematographic application module 50 (hereinafter called the VC).

Architecture

The film cinematography expertise described above is encoded in computer software in the VC 50 as acts and symbolic representations of operations that are performed by computer system 10. The VC 50 contains two main components: camera modules and idioms. Camera modules implement virtual cameras from which computer-generated images are formed using the different camera placements, which are described above and illustrated in FIG. 5. The camera modules may also slightly modify the position of virtual actors to compose a better shot and influence virtual actors' scale of performance. Idioms describe the logic used for combining shots from the camera modules into sequences, as was also described above for film.

Camera modules

Each camera module takes as input a number of virtual actors, called primary actors; the exact number depends on the particular camera module. Each camera module places the virtual camera at a particular distance from the actors to fit the five cutting heights discussed above. However, more or fewer cutting heights could also be used. The virtual camera position also places the actors at particular locations in the shot. In addition, the camera module may reposition the actors slightly to improve the shot. Finally, the camera placement is automatically chosen to obey the rule about not crossing the Line 62 explained above.

In an exemplary embodiment of the present invention, 19 different camera modules have been implemented, as indicated below. However, more or fewer camera modules could also be used.

Figure 9:
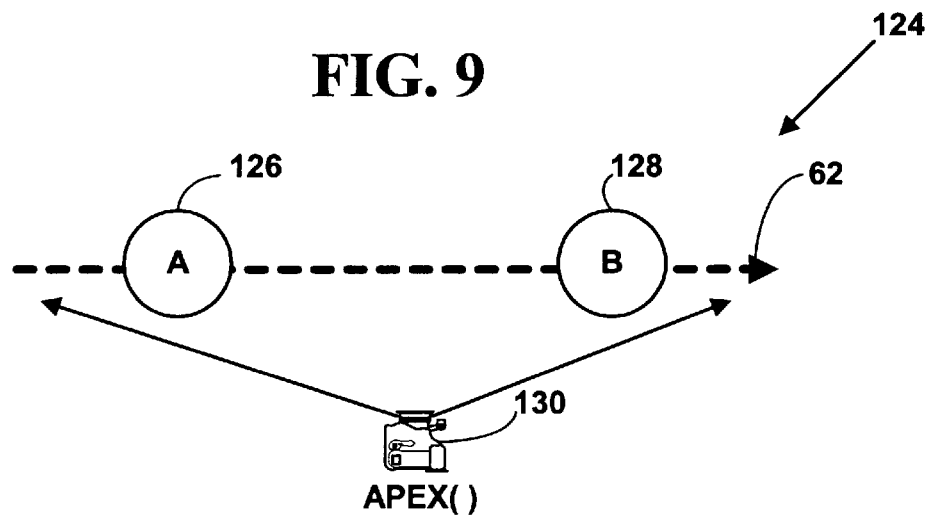
FIG. 9 is a block diagram illustrating the apex camera module.

As is shown in FIG. 9, camera module apex(actor1, actor2) 124 takes as input two actors A 126 and B 128 (corresponding to actor 1 and actor 2) and places the virtual camera 130 so that the first actor A 126 is centered on one side of the shot and the second actor B 128 is centered on the other side with respect to the Line 62. The camera distance is a function of the distance between the two actors A 126 and B 128 indicated schematically by circles.

Figure 10:
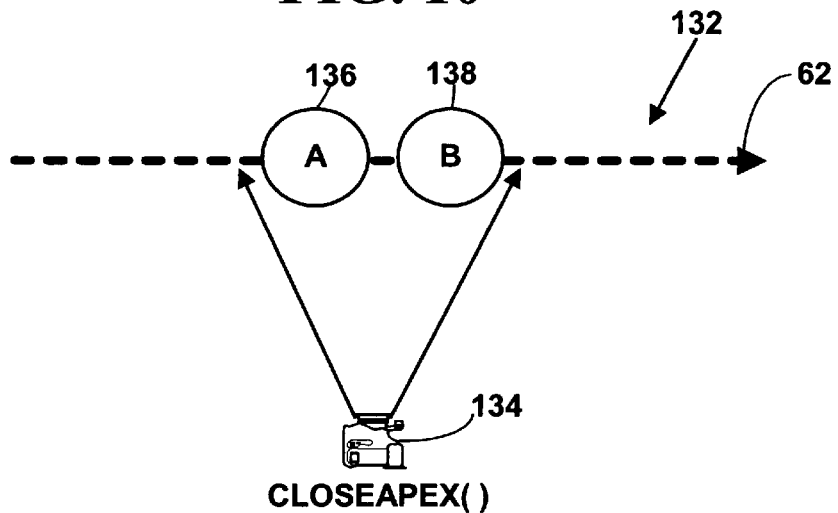
FIG. 10 is a block diagram illustrating the closeapex camera module.

As is shown in FIG. 10, camera module closeapex(actor1, actor2) 132 also implements an apex camera placement. However, the closeapex camera module differs from the apex() camera module in that the latter always uses a close-up camera distance for the virtual camera 134 with respect to the Line 62. To compose a more pleasing shot, this camera module 132 may move the actors A 136 and B 138 closer together.

Figure 11:
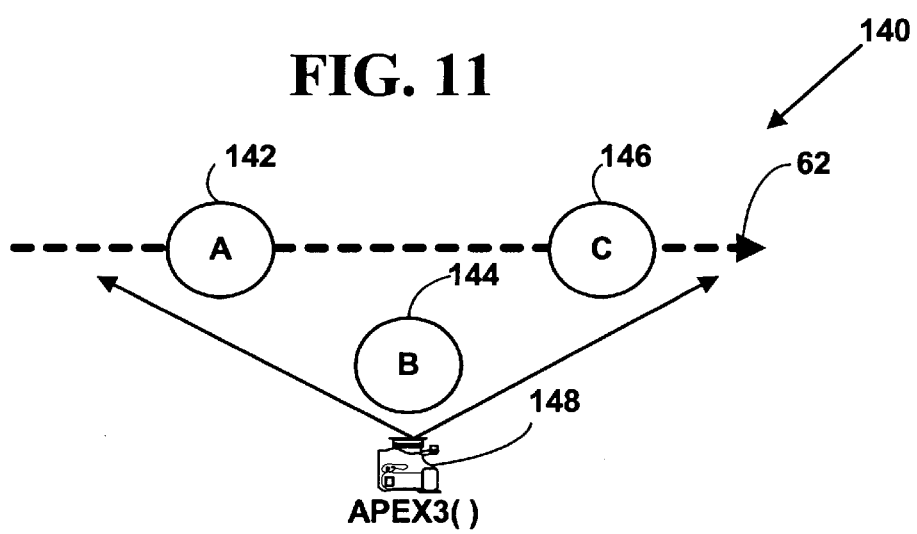
FIG. 11 is a block diagram illustrating the apex3 camera module.

As is shown in FIG. 11, camera module apex3(actor1, actor2, actor3) 140 puts actors A 142, B 144, and C 146 in an equilateral triangle arrangement. Camera module apex3() puts the virtual camera 148 in the same relative position as apex() 124 and closeapex() 132, but it will always pick the side of the Line 62 of interest to the current shot.

Figure 12:
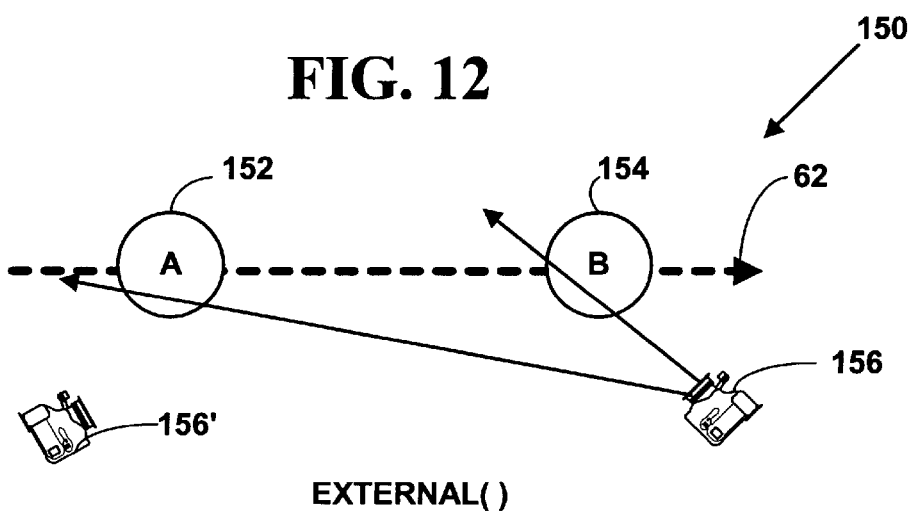
FIG. 12 is a block diagram illustrating the external camera module.

As is shown in FIG. 12, camera module external (actor1, actor2) 150 takes as input two actors A 152 and B 154 and places the virtual camera 156 so that the first actor A 152 is seen over the shoulder of the second actor B 154, with the first actor A 152 occupying two-thirds of the shot and the second actor B 154 occupying the other third of the shot. Similarly, the camera module external (actor2,actor1) places the virtual camera 156' so that the second actor B 154 is seen over the shoulder of the first actor A 152, with the second actor B 154 occupying two-thirds of the shot and the first actor A 152 occupying the other third of the shot. These external() camera module views are illustrated in boxes 116,118 of FIG. 8.

The 2shot(actor1,actor2) camera module (not illustrated) is similar to external, but uses a long view of both actors.

Figure 13:
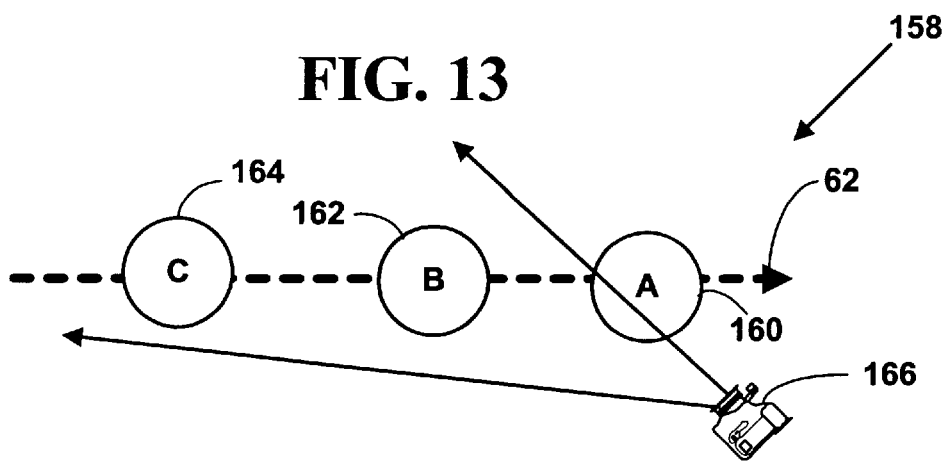
FIG. 13 is a block diagram illustrating the external1to2 camera module.

As is shown in FIG. 13, camera module external1to2 (actor1, actor2, actor3) 158 implements an external camera placement between one actor A 160 and two other actors B 162 and C 164. The external1to2() camera module places the virtual camera 166 so that two actors B 162 and C 164 are seen over the shoulder of the actor A 160, with the actors B 162 and C 164 occupying two-thirds of the shot, and actor A 160 occupying the rest of the shot. This view is illustrated in box 108 of FIG. 8. This camera module 166 may also modify the actors' positions to compose a better shot.

Figure 14:
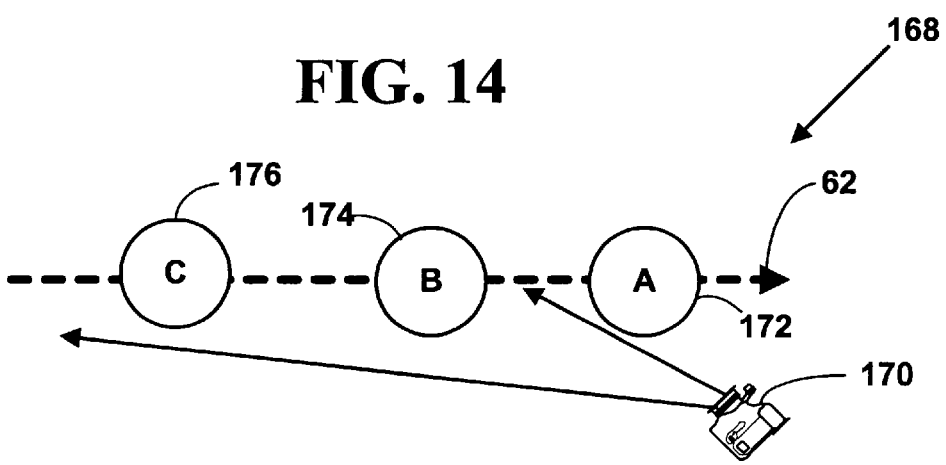
FIG. 14 is a block diagram illustrating the exclose2 camera module.

As is shown in FIG. 14, camera module exclose2(actor1, actor2, actor3) 168 adjusts the focus and orientation of virtual camera 170, which is in the same position as the camera 166 in camera module external1to2() 158, so that only two actors of the three actors appear in the shot. For example, actors B 174 and C 176 appear in the shot, while actor A 172 does not appear in the shot.

Figure 15:
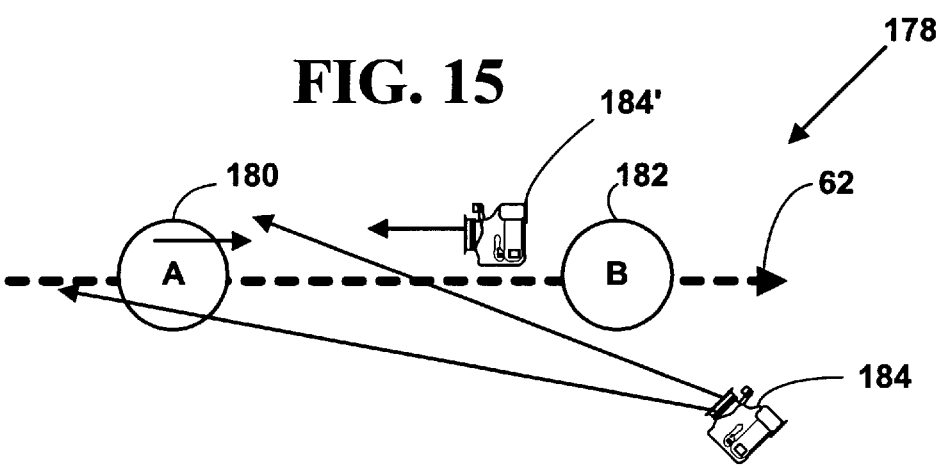
FIG. 15 is a block diagram illustrating the internal camera module.

As is shown in FIG. 15, camera module internal (actor1, [actor2]) 178 may consist of either one or two actors. If two actors A 180 and B 182 are specified, the camera 184 is placed along the same line of sight as the external() camera module 150, but closer in and with a narrower field of view, so that the first actor A 180 is seen all alone, occupying two-thirds of the screen. If a single actor A 180 is specified, then the Line 62 is taken to be along the direction the actor A 180 is facing; the camera placement 184' is chosen in the same way relative to this line.

Figure 16:
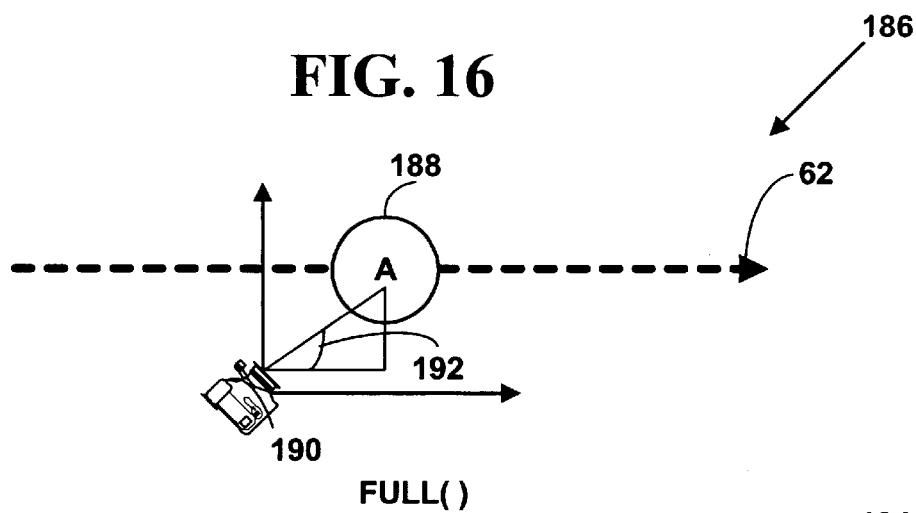
FIG. 16 is a block diagram illustrating the full camera module.

As is shown in FIG. 16, the full(actor, theta) camera module 186 puts an actor 188 in the center of the shot. The camera distance to the actor 188 is adjusted so that the full body of the actor 188 is shown. The angle between the orientation of the camera 190 and the orientation of the actor 188 is theta 192.

The next three related camera modules tracking(), panning(), and follow() are used when an actor is moving, They differ from the preceding camera modules just described in that they define a moving camera that dynamically changes position and/or orientation to hold a desired actor's placement near the center of the shot with respect to a second actor. In the camera modules described above the camera position was fixed. The camera modules tracking(), panning(), and follow() use minimum and maximum distance constraints to determine how far to place the camera from the Line 62.

Figure 17:
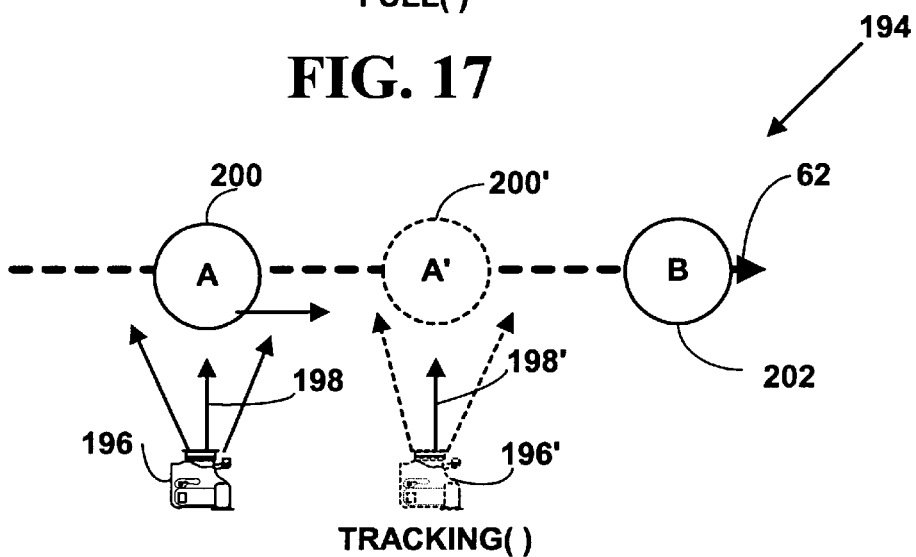
FIG. 17 is a block diagram illustrating the tracking camera module.

As is shown in FIG. 17, the tracking (actor1, actor2, mindist, maxdist) camera module 194 sets the camera 196 along a line 198 perpendicular to the Line 62. The camera 196' then moves with the actor A 200', maintaining the same orientation 198' to actor A 200' as actor A approaches actor B 202.

Figure 18:
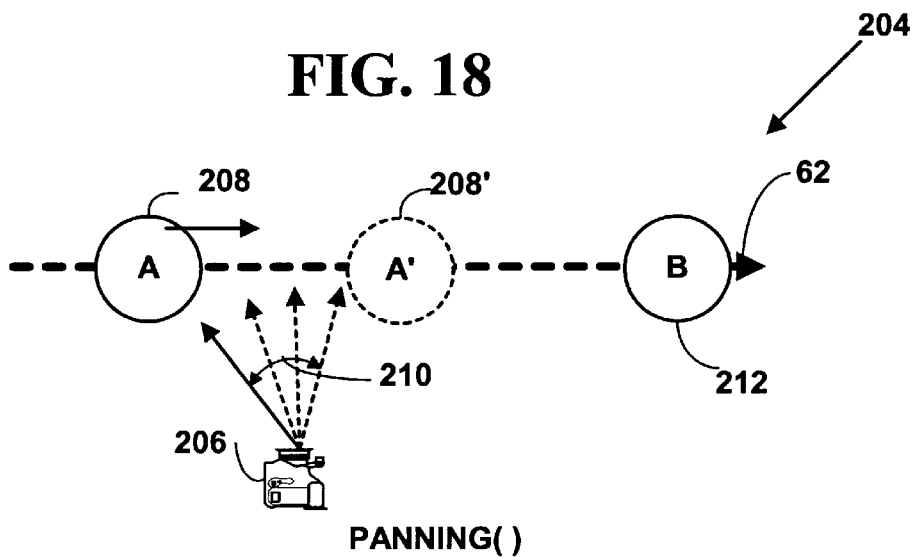
FIG. 18 is a block diagram illustrating the panning camera module.

As is shown in FIG. 18, the panning(actor1, actor2, mindst, macxdist) camera module 204 sets the camera 206 off the Line 62 ahead of the actor A 208 and then pivots in place 210 to follow the motion of the actor A 208' as actor A approaches actor B 212.

Figure 19:
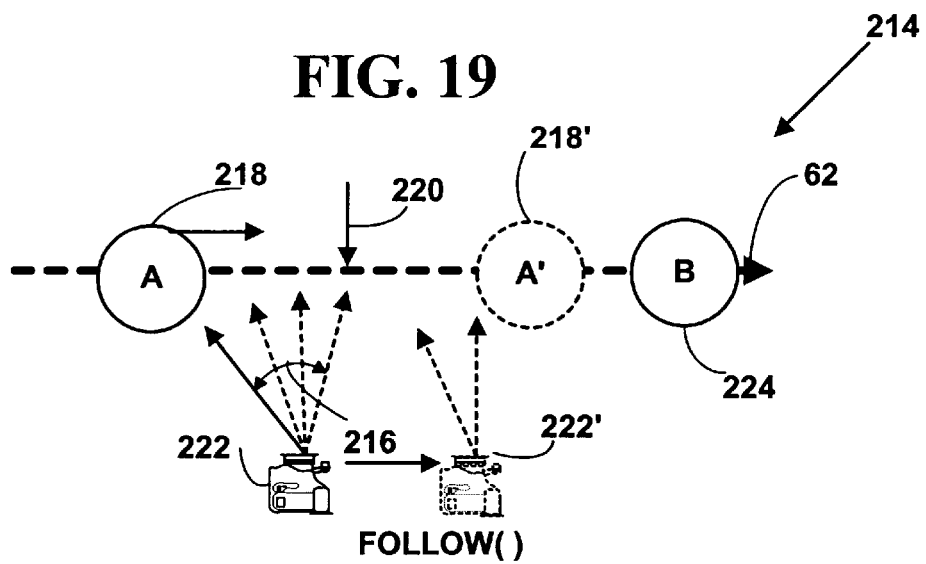
FIG. 19 is a block diagram illustrating the follow camera module.

As is shown in FIG. 19, the follow(actor1, actor2, mindist, maxdist) camera module 214 combines the tracking() 194 and the panning() 204 camera module operations. It first behaves like a panning camera 216, but as actor A 218 passes by a predetermined point 220, the camera 222 begins to "follow" 222' the actor A 218 from behind (i.e., tracking) rather than allow actor A 218' to move off into the distance as actor A approaches actor B 224.

Figure 20:
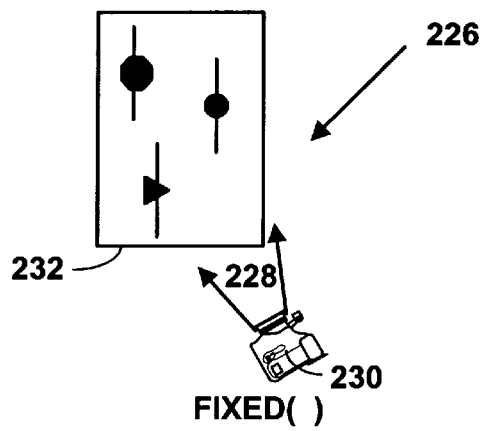
FIG. 20 is a block diagram illustrating the fixed camera module.

The remaining camera modules perform miscellaneous functions. As is shown in FIG. 20, the fixed (cameraspec) camera module 226 is used to specify a particular fixed location, orientation, and field of view 228 for a camera 230. It is used to provide an overview shot of a scene 232.

Figure 21:
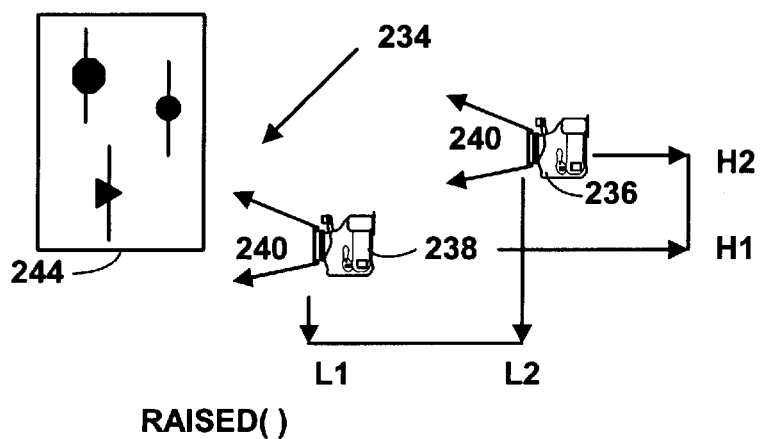
FIG. 21 is a block diagram illustrating the raised camera module.

As is shown in FIG. 21, the raised() camera module 234 provides a placement relative to the previous camera position. The new camera position 236 is further back L2 and higher H2 than the old camera position 238 at L1,H1 but has the same orientation 240 to the scene 244 as the previous camera 238.

As is shown in FIG. 22, the group(conversation) camera module 246 covers all actors 248, 250, 252 in a conversation. The group() shot from the camera 254 is determined by the graphical information 256 (e.g., the bounding box) sent by the real-time application module 46.

As is shown in FIG. 23, the subjective (actor, target) camera module 258 synchronizes the camera 260 to a position on the actor's head 262. From the actor's head 262, an orientation is based on a vector 264 from the actor's head 262 to a target 266 (e.g., another actor or an object in the scene).

The following three camera modules are not illustrated with individual figures as the function of each is easily determined. The subjectzoom(actor) camera module is similar to the subjective() camera module 258, but the focal length of the camera 258 becomes longer as time goes on and the actor moves around the scene. The pov(actor) camera module simulates the forehead of an actor. This camera module follows the position and orientation of the actor's forehead. The null () camera module leaves the camera in its previous position. This camera module allows a camera orientation to remain unchanged.

Choosing virtual camera placements with respect to the Line

As was described above and shown in FIG. 4, the Line 62 is defined relative to the two actors 64,66 in the shot. Thus, the Line 62 itself will inevitably vary from shot-to-shot. The rules of film cinematography dictate that when the Line 62 remains constant, the camera 70 should remain on the same side of the Line 62, With respect to the Line 62, the camera modules for a given specification (e.g. actor[1], actor[2]) can describe one of two instances that correspond to symmetric positions on the two sides of the Line 62. If the Line 62 does not change from one shot to the next, the selection of the particular instance is trivial: choose the camera position 70 on the same side of the Line 62.

When the Line 62 changes, for example, when one of the two actors in the shot changes position, the choice is not easily determined. With respect to FIG. 24, and in accordance with an exemplary embodiment of the present invention, the particular instance is selected such that a camera orientation 268 chosen with respect to a new Line 270 is closest to the orientation of the previous camera 70. The camera modules described above that have a choice of more than one camera orientation, and chose the new Line closest to the orientation of the previous camera. However, other camera orientations methods could also be used when the current Line changes.

Influencing the acting with camera modules

As indicated earlier, the camera modules are able to subtly improve the shot by influencing the positions and scale of performance of the actors in the shot. Since the real-time application 46 is primarily in charge of manipulating the actors, the changes made by the VC 50 must be subtle enough to not disturb the continuity between shots.

For example, the closeapex() camera module 132 moves the two primary actors closer together if the distance between them is greater than some minimum, as is shown in box 86 of FIG. 6. The apex3() camera module 140 adjusts the positions of the three primary actors so that no actor is obscured by any other in the shot as is shown in FIG. 7B. Some camera modules can remove actors from the shot altogether to avoid situations in which an actor appears only part way on screen or occludes another primary actor in the scene. For example, the internal() camera module 178 removes the second actor B 182 from the shot as is shown in FIG. 15, in much the same way that a real internal reverse shot is filmed.

The camera modules also affect the scale of performance of an actor. For example, the degree to which the actor's head moves when nodding, or the actor's legs swing when walling. A change is applied to all the actors in the shot (not just primary actors) by setting a parameter associated with each actor that the renderer 54 can use for scaling the actors' movements. A simple function L (scalequation) is used to set this parameter. The function increases monotonically as the size of the actor on the screen decreases and is represented as:

$$L = \arctan(\text{distance} - D_n) \cdot k + 1.0,$$

where $D_n$ is the distance to where the actor has a normal level of performance (e.g., 1.0) and k scales L to within the range 0.5 to 1.5.

Detecting occlusion with camera modules

Camera modules have one additional responsibility beyond placing the virtual camera. They are also responsible for detecting when one or more of the primary actors becomes occluded in the scene (e.g., actor Z 98 in FIG. 7A). In the case of occlusion, the camera module increments an occlusion counter or resets the counter to zero if the occluded actors become unoccluded. This counter is used by the idioms for deciding whether to change to a different shot. For example, an idiom that would typically hold a shot for a predetermined time interval (e.g., 20 time ticks) might decide to change shots more quickly if an occlusion is detected.

Using the camera modules

With reference to FIG. 3, at some predetermined time interval (i.e., each frame of an animation sequence, the real-time application 46 sends VC 50 a description of events that occur in that time interval and are significant to a desired actor. Events are of the form (subject, verb, object). As examples, a (B, talk, A) event means that actor B is talking to actor A, and a (A, move, Bar) event means that actor A is going to move to the bar. The subject is an actor, while the object may be an actor, a current conversion, a fixed object (e.g., the bar), or null. In the exemplary embodiment, verbs may be one of the set (idle, talk, react, lookat, join, signal, move) as will be explained below. However, more or fewer verbs could also be used, and other event forms can also be used.

The VC 50 uses the current events plus an existing state of the animation (e.g., how long the current shot has lasted) to produce an appropriate virtual camera specification that is delivered to the renderer module 54. To produce a virtual camera specification, the VC 50 may query 56 the real-time application 46 for additional information, such as a specific location and a bounding box of various virtual actors. A bounding box is a box that encloses all or part of a virtual actor and is known to those in the art. The VC 50 may also make subtle changes in the virtual actors' positions and motion, called acting hints. Any changes in the virtual actors positions are also delivered 52 to the renderer 54.

The renderer 54 renders the scene using the current description of the environment, the animation parameters 58 for the actors sent by the real-time application 46, and the camera specifications and acting hints 52 sent by the VC 50 to produce a scene in the animation sequence.

Idioms

The VC 50 uses idioms in addition to the camera modules. A single idiom encodes the expertise to capture a particular type of situation, such as a conversation between two virtual actors or the motion of a single virtual actor from one point to another. The idiom is responsible for deciding which shot types are appropriate and under what conditions one shot should transition to another. The idiom also decides when the situation has changed enough to have moved outside the idiom's domain of expertise, for example, when a third person enters a two-person conversation.

Figure 25:
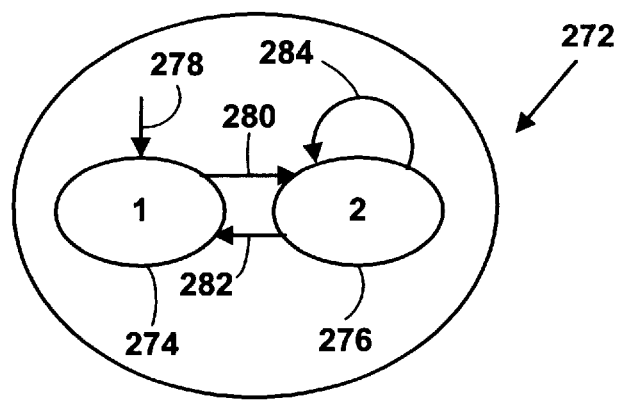
FIG. 25 is a block diagram illustrating a finite state machine for an idiom

As is shown in FIG. 25, an idiom in the VC 50 is implemented as a hierarchical finite state machine (FSM) 272. Each state 274,276 within the FSM 272 invokes one or more camera modules. Thus, each state corresponds to a separate shot in the animation being generated. Each state also includes a list of conditions 5 which, when one is satisfied, cause the FSM 272 to exit along one of the arcs 278–284 to another state. For example, a condition C causes an exit from state 1 274 to state 2 276 along arc 280. As a result, a cut is implicitly generated whenever an arc in the FSM 272 is traversed. The FSMs are hierarchical in that each state may itself be an entire FSM, with particular entry and exit states, which FSM is executed when the state is entered.

Figure 26:
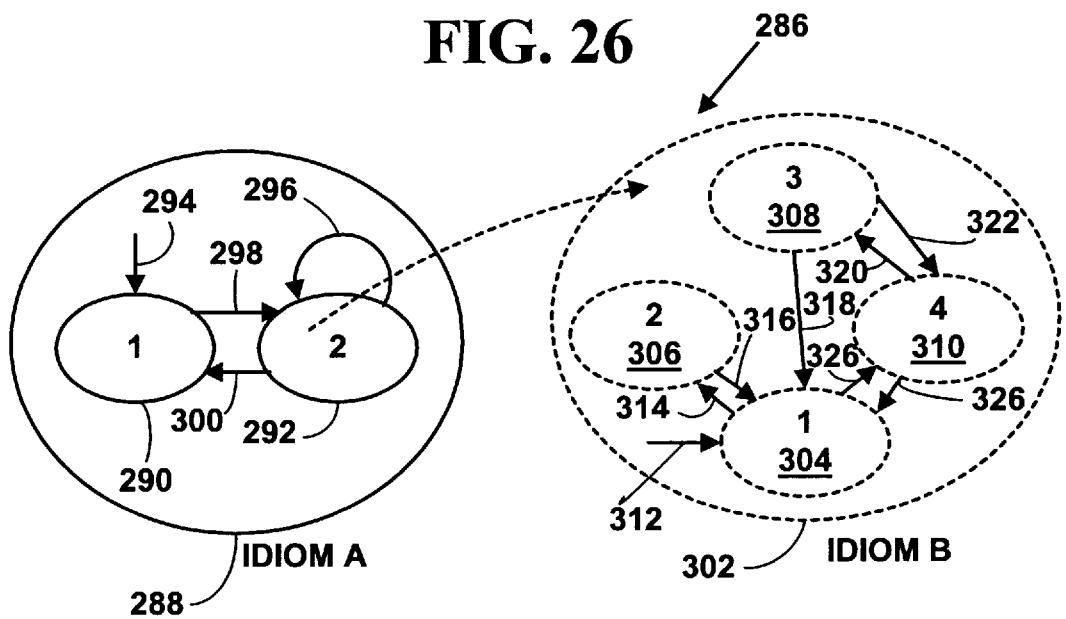
FIG. 26 is a block diagram illustrating a finite state machine with a state which contains another finite state machine.

FIG. 26 is an example of a hierarchical FSM where a state is itself a FSM. Idiom A 288 has two nodes: node 1 290; and node 2 292. The two nodes are connected with arcs 294–300. In this case, the node labeled 2 292 is called a parent because it is an FSM 302 with four child states 304–310 and arcs 312–326 as is illustrated in idiom B. Note that the parent state 292 is treated the same as any other state, regardless of whether any child states are included.

Idioms are defined with the following syntax:
DEFINE_IDIOM_IN_ACTION(<name>)

```
<actions>
END_IDIOM_IN_ACTION
DEFINE_IDIOM_OUT_ACTION(<name>)
    <actions>
END_IDIOM_OUT_ACTION
```
where <name> is the name of an idiom (e.g., 2Talk, which shows two virtual actors talking), and <actions> are the actions that take place for an idiom when it is entered (IN_ACTION) and before the idiom is exited (OUT_ACTION). An example of an action is WHEN(talking(A,B) GOTO(1)), meaning that when virtual actors A and B are talking, the VC 50 goes to state 1 in the finite state machine for this idiom. Actions are written in the specific programming language used to implement the idioms.

Actions for each state in the finite state machine for an idiom are defined with the following syntax:
```
DEFINE_STATE_ACTIONS(<name>)
    <actions>
END_STATE_ACTIONS
```
where <name> is the name of an action (e.g., COMMON for actions common to each state, 1 for state one), and <actions> are the actions that take place for the state.

A state in the finite state machine for an idiom may have in-actions and out-actions. In-actions are defined with the following syntax:
```
DEFINE_STATE_IN_ACTIONS(<state>)
    <actions>
END_STATE_IN_ACTION
```
where <state> is the name of the state for which the in-actions will be executed, and <actions> are the inaction actions. In-actions are used when a particular state in the finite state machine in an idiom requires special processing when the state is entered. In-actions are not required and may be null for all or most states in the finite state machine of an idiom. Out-actions are defined with the following syntax:
```
DEFINE_STATE_OUT_ACTIONS(<state>)
    <actions>
END_STATE_OUT_ACTION
```
where <state> is the name of the state for which the out-actions will be executed, and actions> are the out-action actions. Out-actions are used when a particular state in the finite state machine in an idiom requires special processing when exiting the state. Out-actions are not required and may be null for all or most states in the finite state machine of an idiom.

The camera modules described above (e.g., external() 150) are defined by camera setup-modules. Camera setup modules have the following syntax:
```
DEFINE_SETUP_CAMERA(<idiom>)
    <camera actions>
END_SETUP_CAMERA_MODULES
```
where <idiom> is the name of an idiom, and <camera actions> are the actions to setup the camera modules for the idiom. In one embodiment of the present invention, two types of camera setup modules are used: make modules and link modules.

MAKE_MODULE(<module id>, <type>, <parameter list>) creates a new camera setup module of the designated type with the specified parameters and gives it a specified identifying module number. LINK_MODULE(<state>, <module id>, <name>) associates the specified camera module with the specified state.

In one embodiment of the present invention, idiom code is written in the C++ programming language as programming macros. Action and other statements defined within the idioms are written using C/C++ programming syntax. However, other programming languages could also be used. The keywords written in all-caps (e.g., MAKE_MODULE) are programming macros. However, idioms could also be implemented without using programming macros. A list of programming macros used to define idioms appears in Appendix A.

When source code containing the idiom macros is compiled, the macros are expanded by the C preprocessor (C++ is typically implemented as an extension to the C programming language) into C/C++ source code. The definition of each idiom macro includes one or more calls to C++ procedures which actually accomplish the desired actions for the idiom macro. For example, the macro DEFINE_SETUP_CAMERA_MODULES() is expanded to call a C++ routine SetupCameraModules() to accomplish the camera module setup.

In one embodiment of the present invention, there are several global variables that can be used in state actions which include: Occluded, the number of consecutive time units that one or more of the primary actors has been occluded; T, the number of time ticks or units in the current state, IdiomT, the total number of time units spent so far in this idiom as a whole; D[A,B], the distance between the actors (measured in units of "head diameters" which is explained below), and forwardedge[x], rearedge[x], centerline[x], the edges of the bounding box of virtual actor x, relative to the screen coordinates. However, more or fewer global variables could also be used.

There are also a number of predefined control structures used in one embodiment of the present invention: STAY, meaning remain in the same state for another time unit; GOTO (x), meaning transition to state x; RETURN, meaning return to the parent state, and CALL (idiom, <Parameter List>), meaning execute the specified idiom by passing it the specified list of parameters. However, more or fewer predefined control structures could also be used.

The concepts involved in constructing idioms are illustrated with examples. In the first example, an idiom for depicting a conversation between two virtual actors, called 2Talk is illustrated. In the second example, the 2Talk idiom is used as a +primitive in building a more complex idiom, called 3Talk, for depicting a conversation among three virtual actors.

The 2Talk idiom example

Figure 27:
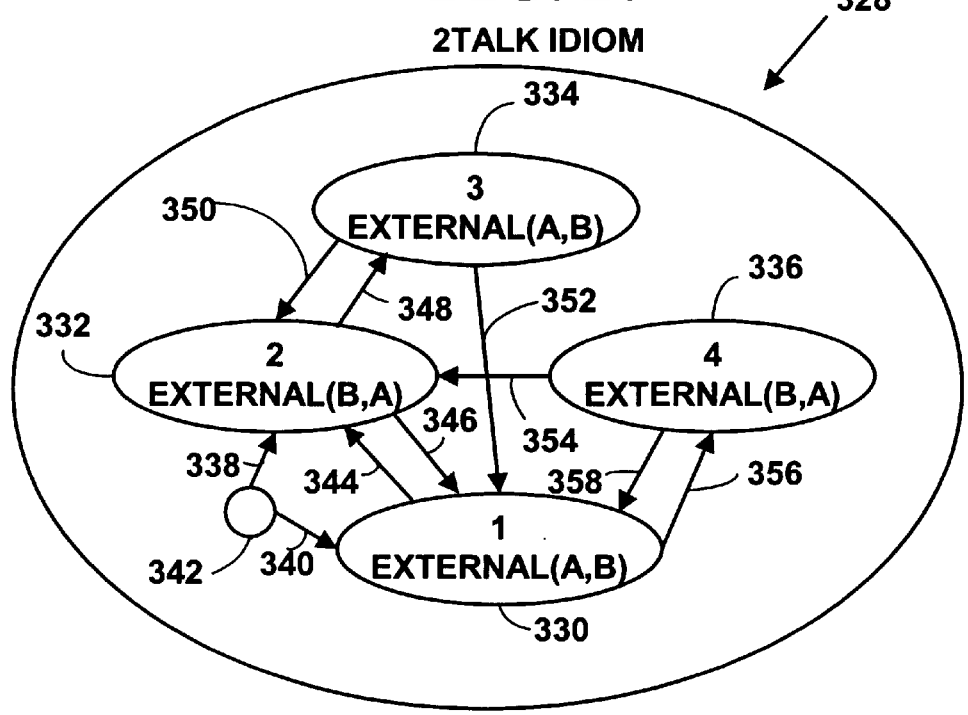
FIG. 27 is a block diagram illustrating an idiom for a conversation between 2 actors.

The 2Talk idiom example encodes a method for filming two virtual actors as they talk and react to each other. It uses only external reverse shots (72,84) (FIG. 5) of the two actors. FIG. 27 shows the 2Talk finite state machine 328. The 2Talk procedure takes as parameters two virtual actors A and B who are conversing. It has four states 330–336. The first state 330 uses an external camera module 150 (FIG. 12), which shows A talking to B. The second state 332 is used for the opposite situation, when B talks to A. The third and fourth states 334,336 use external camera module 150 placements to capture reaction shots of each of the actors.

When the 2Talk idiom 328 is activated, it follows one of two initial arcs 338,340 that originate at the small circle called an "entry point" 342. The arc to be used (338 or 340) is determined by the following source code:
```
DEFINE_IDIOM_IN_ACTION(2Talk)
    WHEN (talking(A, B))
    DO (GOTO(1);)
    WHEN (talking(B, A))
    DO (GOTO(2);)
END_IDIOM_IN_ACTION
```
This idiom code tests whether A is talking to B, or B is talking to A and transitions (338, 340) immediately to the appropriate state in the 2Talk idiom, in this case, either state 1 or 2 (330,332), respectively.

As a state is entered, it executes a set of in-actions for the state. The in-actions are often null, as is the case for all of the states in the 2Talk idiom example. Once a state is entered, the state's camera module (e.g., external0 150 ) is called to position the virtual camera. The state then executes a sequence of actions at a predetermined time interval T (e.g., every clock tick). These actions include execution of C++ procedures as was described above. In addition, the actions can be used to affect conditional transitions (344–358) to other states. Finally, when the state is exited, it executes a set of out-actions, again, which are null in the case of the 2Talk idiom.

In the 2Talk idiom, the camera setup modules are defined as follows:
DEFINE_SETUP_CAMERA_MODULES(2Talk)
MAKE_MODULE(1, external, (A, B))
MAKE_MODULE(2, external, (B, A))
LINK_MODULE(1, 1, "A talks")
LINK_MODULE(2, 2, "B talks")
LINK_MODULE(3, 1, "A reacts")
LINK_MODULE(4, 2, "B reacts")
END_SETUP_CAMERA_MODULES For example, MAKE_MODULE(1, external, (A,B)) creates a camera module of type external0 150 with two virtual actors A and B, and assigns it the identifying number 1. LINK_MODULE(1,1,"A talks") means that whenever state 1 is entered an external reverse shot of actor A (i.e., "A talks") over the shoulder of actor B will be used as is defined by MAKE_MODULE(1, external(A,B)). LINK_MODULE(3, 1,"A reacts") means that in state 3, actor A will react (e.g., by nodding) to the conversation with actor B defined by MAKE_MODULE(1, external(A,B)).

The first action code to be executed in each state can be specified in a block common to all states. This is primarily a shorthand mechanism to avoid having to re-specify the same (condition,arc) pairs in each state of the idiom. However, the idioms could also be used without a block common to all states.

Common actions in the 2Talk idiom are:
DEFINE_STATE_ACTIONS(COMMON)
WHEN (T<10)
DO (STAY;)
WHEN (!talking(A, B) && !talking(B, A))
DO (RETURN;)
END_STATE_ACTIONS However, more or fewer common actions could also be used. A common block is defined with the same syntax as any other non-common state.

The first statement (WHEN (T<10)) initiates a check to see whether the total time T spent so far in this state is less than 10 time units (e.g., 10 ticks of the clock). If fewer than 10 time units have expired, the current state remains unchanged. An EXCEPTION mechanism, which will be explained below, takes precedence over testing for elapsed time and can pre-empt the shot. If the shot has lasted at least ten ticks, but A and B are no longer conversing, then the idiom returns to the idiom that called it. The variable T is a global variable that is accessible to any state.

The actions code in the common block makes use of a domain-specific procedure called talking(A,B), which returns true if and only if the current list of events includes (A,talk,B), (i.e., virtual actor A is talking to actor B). In the code shown above, the exclamation mark "!" is the C/C++ NOT operator, and the double ampersand "&&" is the C/C++ AND operator. The action statements are evaluated sequentially. Thus, earlier statements take precedence over statements listed later in the code.

State 1 330 of the 2Talk idiom 328 is used to depict actor A talking to B. In addition to the common actions, the list of actions executed at each time unit T when in state 1 330 are:
DEFINE_STATE_ACTIONS(1)
WHEN (talking(B, A))
DO (GOTO (2);)
WHEN (T>30)
DO (GOTO (4);)
END_STATE_ACTIONS However, more or fewer actions could also be used. If B is now talking to A, then transition 344 to state 2 332 is required to capture this situation. If an actor has been in the same shot for more than 30 time units T, there should be a transition 356 to state 4 336 to get a reaction shot from the other actor.

State 2 332, which addresses the case of actor B talking to actor A, is completely symmetric: the code is exactly the same for state 1 330 shown above except that A and B are swapped (e.g., talking(A,B) and states 1 330 and 3 334 are used in place of states 2 332 and 4 336 (e.g., DO(GOTO(1)) and DO(GOTO(3))).
DEFINE_STATE_ACTIONS(2)
WHEN (talking(A,B))
DO (GOTO (1);)
WHEN (T>30)
DO (GOTO (3);)
END_STATE_ACTIONS The action code for state 3 334 is shown below: However, more or fewer actions can also be used for state 3 334.
DEFINE_STATE_ACTIONS(3)
WHEN (talking(A,B))
DO (GOTO (1);)
WHEN (talking(B, A) || T>15)
DO (GOTO (2);)
END_STATE_ACTIONS If actor A is now talking to B, then transition 352 to state 1 330 is required to capture this situation. If actor B is now talking to actor A, or "||" if an actor has been in the same shot for more than 15 time units T, there should be a transition 350 to state 2 332.

Note that state 3 334 can make a transition 352 back to state 1 330, which uses the same camera module as is used here in state 3 334. In this case, the two shots are merged into a single shot without any cut.

Finally, state 4 336 is symmetric to state 3 334.
DEFINE_STATE_ACTIONS(4)
WHEN (talking(A, B))
DO (GOTO (1);)
WHEN (talking(B, A) || T>15)
DO (GOTO (2);)
END_STATE_ACTIONS Since the out-actions are null for the 2Talk idiom 328, the 2Talk idiom 328 has been completely described. More or fewer states, and more, fewer or alternative actions within each state can also be used to define the 2Talk idiom. The 2Talk idiom 328 can now be used as a subroutine for a higher level idioms (e.g., to handle conversations among three actors).

The 3Talk idiom example

Figure 28:
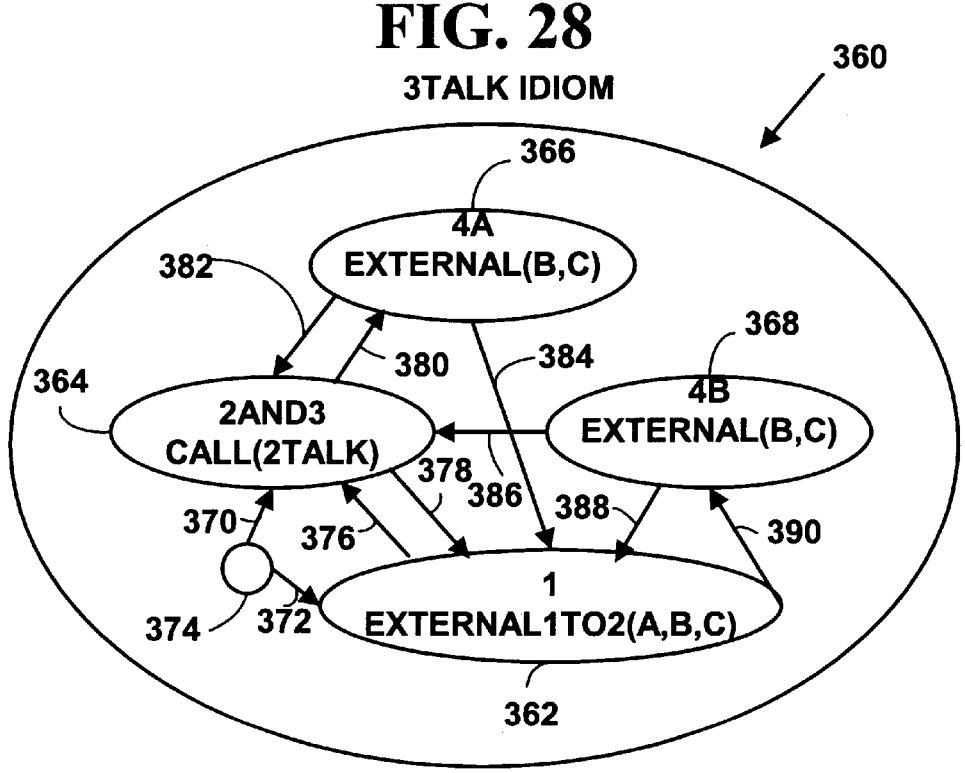
FIG. 28 is a block diagram illustrating an idiom for a conversation between 3 actors.

The 3Talk idiom example is built from the 2Talk idiom 328. The finite state machine for the 3Talk idiom 360, which handles conversations among three virtual actors, is shown in FIG. 28. This idiom 360 implements the cinematic treatment of three actors described by Arijon and illustrated in FIG. 8. The 3Talk FSM has the same types of components as 2Talk 328: it has states 362–368 and arcs 370–390 representing transitions between states. In addition, this FSM uses an EXCEPTION mechanism, as is discussed below.

The 3Talk idiom has four states 362–368. The first state 362, labeled 1, is an establishing shot of all three actors, corresponding to the first camera position 100 in FIG. 8. The second state 364, labeled 2AND3, is a parent state that CALLs the 2Talk idiom 328, and corresponds to cameras 2 110 and 3 112 in FIG. 8. Finally, the last two states, labeled 4A 366 and 4B 368, capture the reaction shot of the first actor; these two states correspond to camera shot 4 122 of FIG. 8.

All four states have actions that are similar to the ones described in 2Talk 328. The two states 4A 366 and 4B 368 have been implemented as separate states because they function differently in the 3Talk idiom, even though they both shoot the scene from the same virtual camera. State 4A 366 is used in the opening sequence, or after a new establishing shot, allowing shots of all three actors to be alternated with reaction shots of actor A. By contrast, state 4B 368 is only used once a two way conversation between actor B and C becomes dominant, to get an occasional reaction of actor A and then quickly return to the two-way conversation between B and C.

The one state that differs from the states considered earlier is the state labeled 2AND3 364. First, unlike the previous states, state 2AND3 364 does have in-actions that are illustrated by the following macro code:

DEFINE_STATE_IN_ACTION(2and3)
REGISTER_EXCEPTION(left_conversation, A, LEFT_CONVERSATION);
REGISTER_EXCEPTION(too_long, 100, TOO_LONG);
REGISTER_EXCEPTION(reacts, A, GET_REACTION);
CALL( 2Talk, (B, C));
END_STATE_IN_ACTION These in-actions register a number of EXCEPTIONS which, when raised, will cause a child idiom to exit and return control to the parent state.

To register an EXCEPTION, a REGISTER_EXCEPTION0 macro is used. Each REGISTER_EXCEPTION(<procedure>, <parameters> <test>, <exception name>) command takes 3 parameters: <procedure>, the name of a procedure to call to test whether or not the exception should be raised; <parameters>, an arbitrary set of parameters that are passed to that function; and the <exception name>, which is an enumerated type. For example, REGISTER_EXCEPTION(too_long, 100, TOO_LONG);

registers EXCEPTION TOO_LONG for a call to procedure too_long0 with parameter of 100 (i.e., the number of time units T to test for a TOO_LONG time period).

The final in-action action (i.e., CALL(2Talk, (B,C)) of state 2AND3 364 calls the 2Talk idiom 328, passing it actors B and C as parameters. All of the registered exceptions are implicitly tested before the actions in every state of the child idiom are executed.

The 2Talk idiom 328 will return either when it executes a RETURN in one of its actions or when one of the EXCEPTIONS is raised. At that point, control is returned to the parent state and its actions are executed. The actions for state 2AND3 364 are:

DEFINE_STATE_ACTIONS(2and3)
WHEN (EXCEPTION_RAISED(LEFT_CONVERSATION))
DO (GOTO(1);)
WHEN (EXCEPTION_RAISED(TOO_LONG))
DO (GOTO(1);)
OTHERWISE
DO (GOTO(4b);)
END_STATE_ACTION In this case, if either the LEFT_CONVERSATION or TOO_LONG EXCEPTION has been raised, then a transition 378 is made back to state 1 362 to get another establishing shot. Otherwise, a transition 378 to state 1 362 is made to get a reaction shot.

In addition to in-actions, state 2AND3 has out-actions. The out-actions of state 2and3, evaluated just before the transition to the new state is made, are used to remove the EXCEPTIONS that were set up by the inactions. The out-actions are illustrated by the following macro code:

DEFINE_STATE_OUT_ACTION(2and3)
DELETE_EXCEPTION(LEFT_CONVERSATION);
DELETE_EXCEPTION(TOO_LONG);
DELETE_EXCEPTION(GET_REACTION);
END_STATE_OUT_ACTION These out-actions remove the EXCEPTIONS for LEFT_CONVERSATION, TOO_LONG, and GET_REACTION that were registered in the in-actions and potentially executed in the state actions for state 2and3.

Idiom hierarchy

Figure 29:
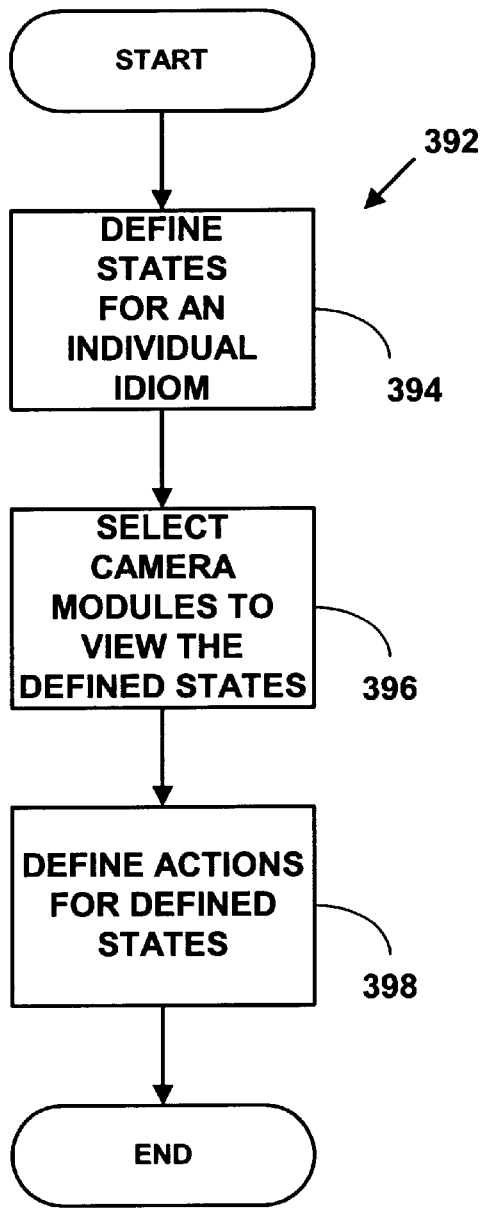
FIG. 29 is a flow diagram illustrating a method to create an individual idiom.

In one embodiment of the present invention, an idiom hierarchy is created starting with individual idioms. As is shown in the flow chart in FIG. 29, a method 392 is used to create an individual idiom. An individual idiom is created by defining the states in an idiom 394 and selecting the camera modules which will be used to view the defined states of the idiom 396. Actions are then defined which include transitions from one defined state to another 398. This method 392 was used to create the 2Talk idiom 328. The 2Talk idiom 328 was created by defining 394 four states 330–336 which represent the 4 camera shots (100,110,112,120) shown in FIG. 8. The four states 330–336 were viewed by selecting 396 the external0 camera module 150 to view all four states. Actions were then defined 398 for the four states which caused transitions from one state to another.

Figure 30:
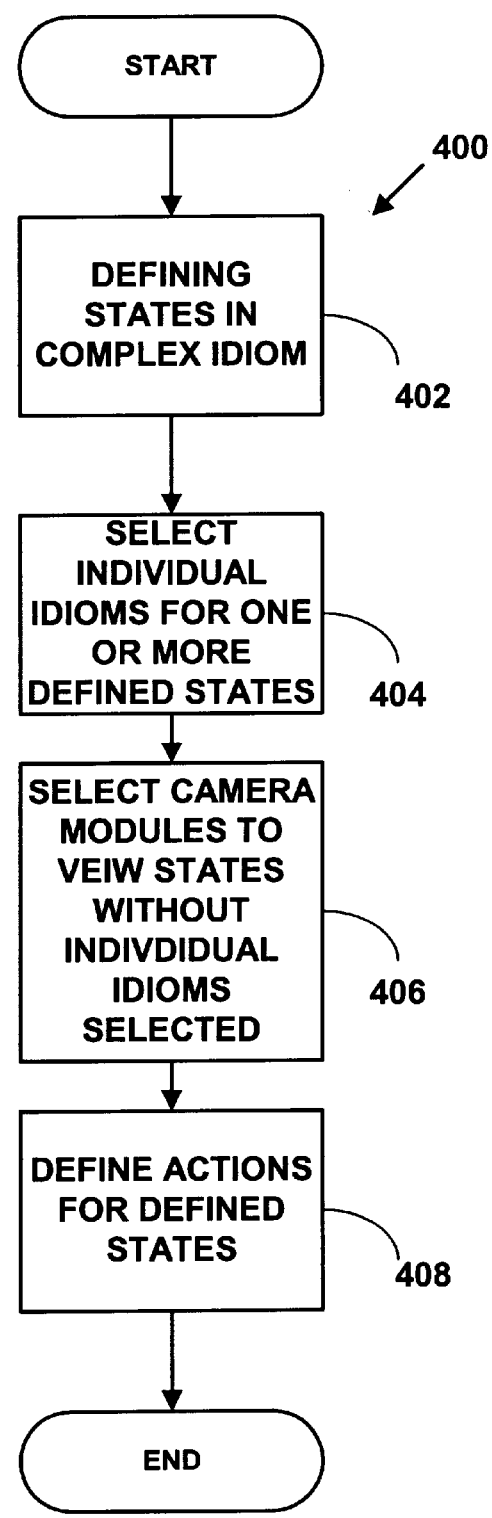
FIG. 30 is a flow diagram illustrating a method to create a complex idiom.

As is shown in the flowchart in FIG. 30, another method 400 is used to create a complex idiom once individual idioms are created with method 392. The complex idiom is created in a manner similar to creating an individual idiom. The states of the complex idiom are defined 402. For one or more of the states, an individual idiom is selected to define the actions of the state 404. Camera modules which will be used to view of the defined states of the idiom are selected for states for which an individual idiom was not selected (if any) 406. Actions are defined which include transitions between the defined states 408. This method 400, was used to create the 3Talk idiom 360. As was described above, 3Talk is an idiom that allows three virtual actors to converse. Since an individual idiom for a conversation for two virtual actors had already been created (i.e., 2Talk 328), the 2Talk idiom was used in the state that required viewing a conversation between only two of the virtual actors.

Figure 31:
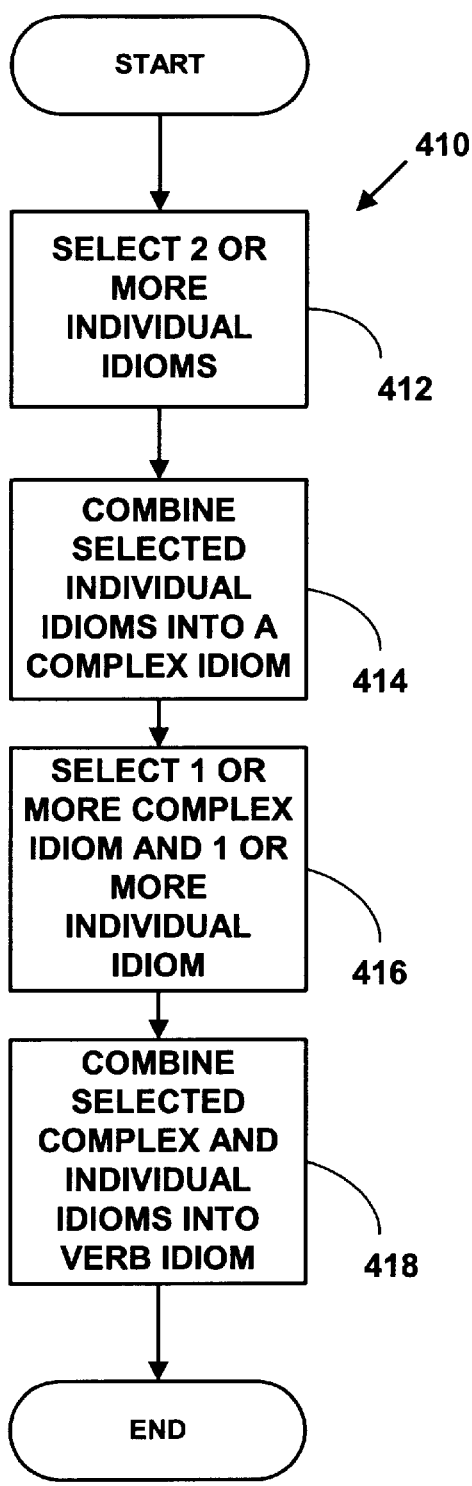
FIG. 31 is a flow diagram illustrating a method to create a high level idiom.

As is shown in the flowchart in FIG. 31, yet another method 410 is used to create an idiom hierarchy. This method 410 includes selecting two or more individual idioms 412, combining the selected individual idioms to create a complex idiom 414. One or more complex idioms and one or more individual idioms are selected 416. The selected complex and individual idioms are combined to form a verb idiom 418. The verb idioms are the high level idioms in the idiom hierarchy. For example, the verb "converse" is created with a combination of the individual 2Talk idiom and the combined 3Talk idiom. The "converse" verb idiom allows a conversation between two or three virtual actors using an external() 150 camera shot.

Figure 32:
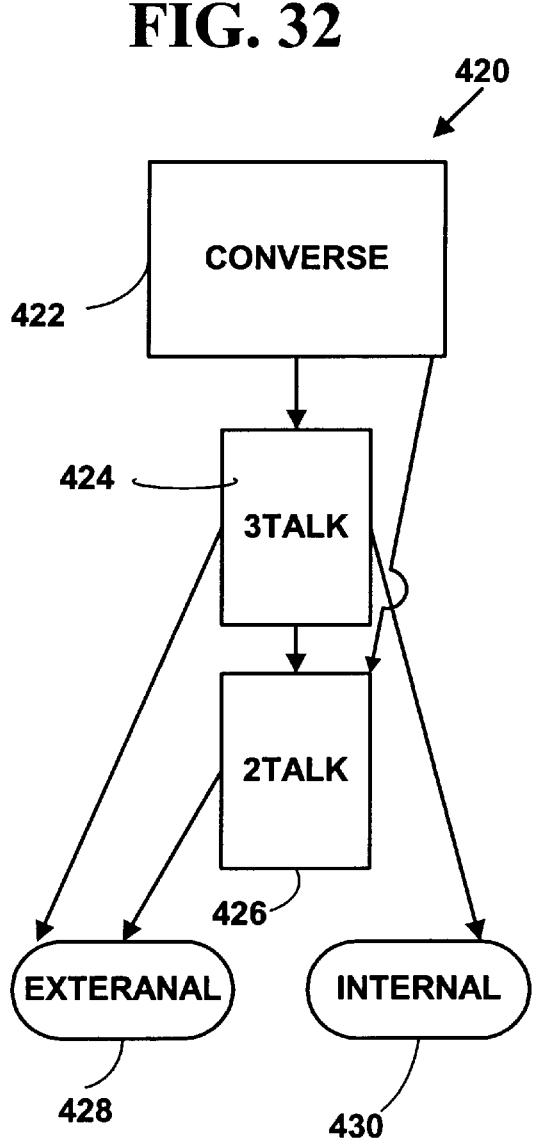
FIG. 32 is a block diagram illustrating one hierarchical idiom structure.

FIG. 32 shows a portion of an idiom hierarchy 420 for the "converse" verb. The "converse" verb 422 is a combination of the 3Talk idiom 424 and the 2Talk idiom 426. This 3Talk idiom (unlike the 3Talk idiom 360 described above) uses the external() and internal() camera modules 428, 430 and calls the 2Talk idiom 426. The 2Talk idiom 426 uses only the external() camera module 428. Other idiom verbs have a similar hierarchy, which includes camera modules at the lowest level, individual idioms above the camera modules, complex idioms above the individual idioms, and verb idioms above the complex idioms.

Individual director style using the idiom hierarchy

Other verb idioms or other high level idioms are created in a similar manner from low level individual idioms. For example, a "move" verb idiom is a combination of an individual idiom 1Move and complex idiom 2Move. Individual idiom 1Move allows one virtual actor to move and uses the camera modules tracking() 194, panning() 204 and follow() 214. Complex idiom 2Move was created from individual idiom Move and allows two virtual actors to move. Methods 392, 400, and 410 can be used to create a virtually unlimited number of idioms. In one embodiment of the present invention, verb idioms may be one of the set C idle, converse, react, lookat, join, signal, move). However, more or fewer verbs could also be used.

As sets or libraries of verb idioms or other higher level idioms are created, a director can easily manipulate virtual actors to "shoot" a virtual movie. The virtual movie would be "shot" with techniques and camera angles that are virtually identical to the techniques and camera angles used for real film. The verb idioms can also be easily customized to fit an individual director's style. For example, director A may use the "converse" verb idiom as described above. However, director B, based on her personal director style may like an internal() camera module 178 to be used in the 2Talk individual idiom 328 instead of the external() camera module 150. Director B can customize the 2Talk idiom to use the internal() camera module 178 to fit her personal preferences.

Figure 33:
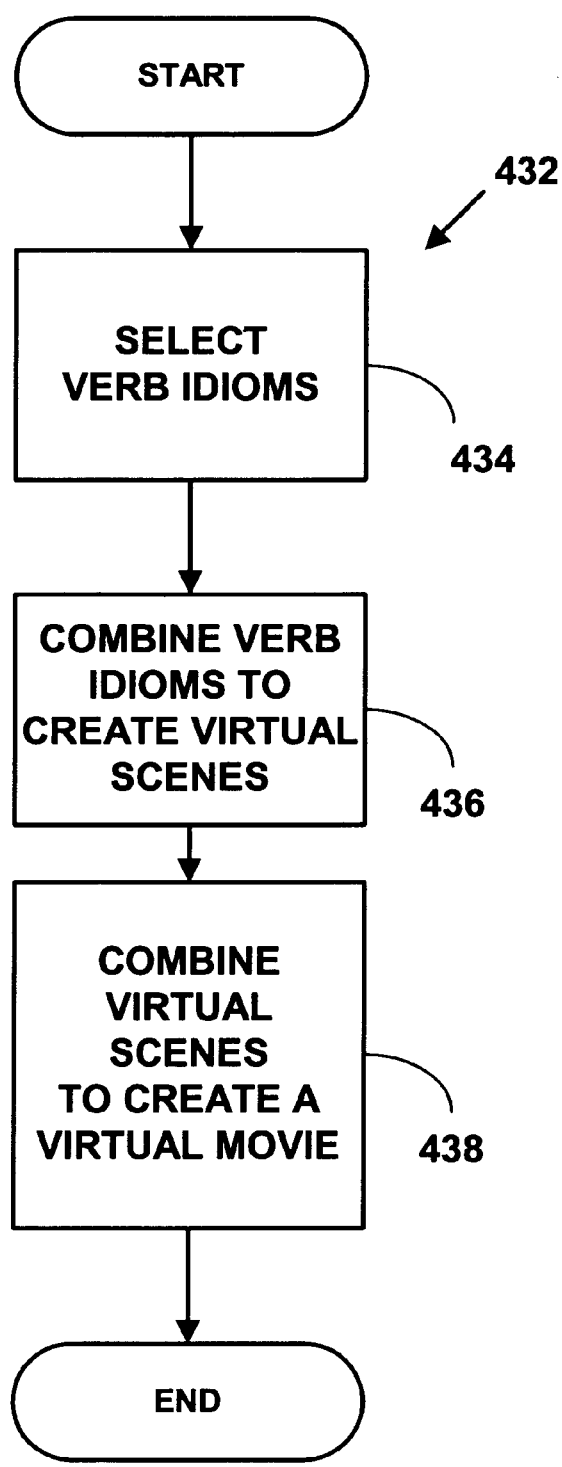
FIG. 33 is flow diagram illustrating a method to create a virtual movie from idioms.

As is shown in the flowchart in FIG. 33, a method 432 for virtual directing uses the idioms and camera modules described above to "shoot" a virtual movie. The VC automatically selects the idiom based upon the events (subject verb, object) and the run time state from a set (e.g., a library) of verb idioms 434. The selected verb idioms are combined to create virtual scenes 436. The virtual scenes are combined to create a virtual movie 438. The director is free to create a virtual movie based on her own style using the VC camera modules and idiom hierarchy.

Screen movement of virtual actors

Capturing motion on a video screen that is used to present the animation with the virtual actors presents special problems. In particular, it may be desirable to end a shot not only when an event is triggered by the real-time system, but also when an actor reaches a certain position on the screen (such as the edge of the screen). The global variablesforwardedge [x], rearedge[x], centerline[x] described above are used to facilitate these kinds of tests.

Figure 34:
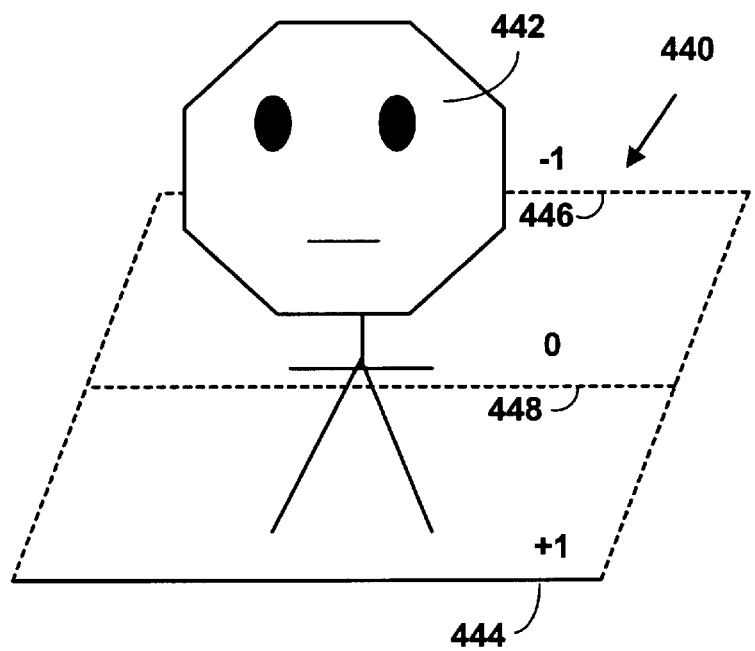
FIG. 34 is a block diagram illustrating an idiom coordinate display system

As is shown in FIG. 34, these variables are measured in a screen coordinate system 440 that is set up relative to the orientation and position of each actor 442. The edge of the screen that the actor is facing is defined to be at +1 444, while the edge to the actor's rear is at −1 446. The center line of the screen is at zero 448. Thus, for example, a state in an idiom can determine if the actor 442 has just reached the edge of the screen by testing whetherforwardedge[x] is greater than 1. A state can also test whether the actor has walked completely off the screen by testing whether rearedge[x] is less than −1. Other methods and coordinate systems could also be used to develop idioms to capture motion on a screen.

Party application

Figure 35:
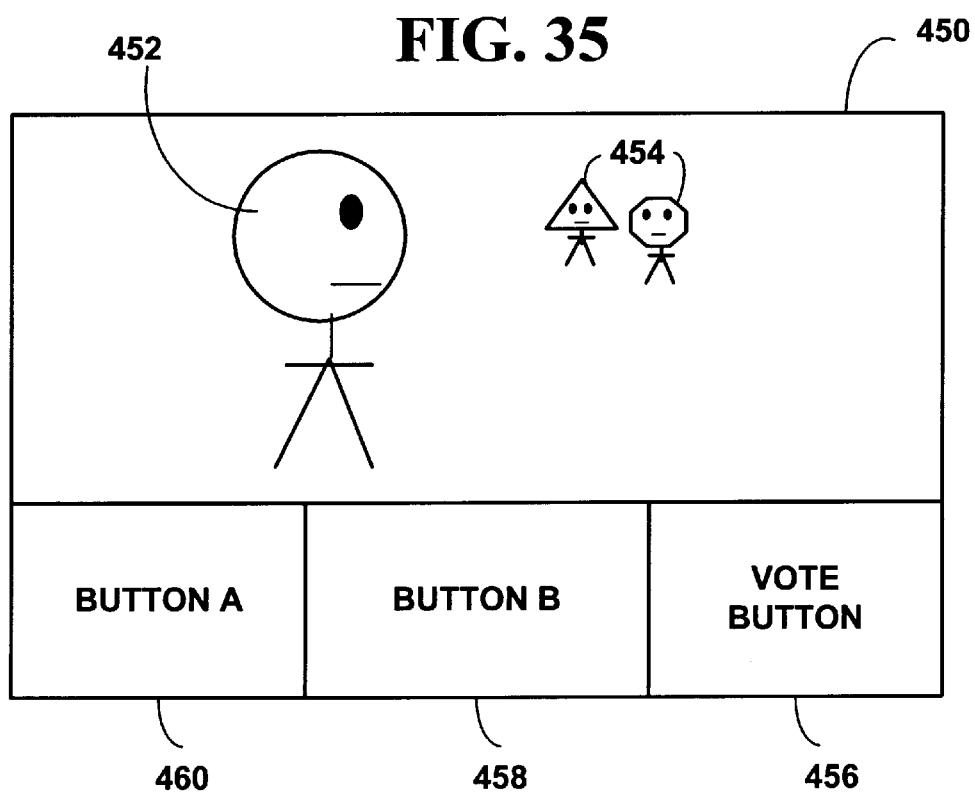
FIG. 35 is a block diagram illustrating a user interface for a virtual cinematographic application.

The methods 34, 392, 400, 410, 432 and system 44 have been applied to a simulated "party" environment. FIG. 35 shows a user interface 450 for a party simulator presented to a participant in a party The party takes place in a virtual room populated by two virtual bars with virtual bartenders and two virtual barstools each, a statue, and other virtual guests. The guests can walk, look around, converse with each other, go to the bars where they drink or talk to the bartenders, or they can simply do nothing.

A user controls the actions of one protagonist virtual actor 452 at a high level of abstraction. The rest of the actors 454 can be controlled automatically as software agents or by other participants in the party. In particular, the user can invoke (verb, object) pairs, that are translated into (subject, verb, object) triples in which the protagonist actor 452 is the subject. Current verbs include, talk, react (which causes the actor to nod), goto, drink (which causes the actor to head for the nearest empty barstool), lookat (which causes the actor to turn their head, stare at the chosen object for a few seconds and then turn their head back), and idle. Each invocation of a verb causes a change in the action of the protagonist shortly after the corresponding button is pushed. The participants of the party are "polite" in that they wait for one actor in a conversation to stop talking before they begin to speak themselves.

An additional interface button 456 allows the actors who stand alone or in a conversation to "vote" whether to accept or reject an actor signaling a desire to join in conversation. The signal verb is implicitly generated when an actor has approached within a short distance of the target of the goto. Other user interface buttons 458,460 permit additional functionality to manipulate the virtual actors.

At each time unit, which is determined with respect to the maximum frame rate and is 5 Hz. in one implementation, the party simulator sends a list of (subject, verb, object) triples of interest to the protagonist's private VC. Triples of interest are those involving the protagonist (or others in the same conversation as the protagonist) as subject or object.

The party simulator is responsible for all low level motion of the actors. This includes walking, movement of the mouth when talking, as well as turning the head to face the current speaker when in a conversation or towards the target of a lookat.

In one embodiment of the present invention, the party simulator, renderer 54, the VC 50, and real-time application 46 are implemented to run simultaneously on the same Pentium-based computer system 10. In another embodiment of the present invention, the party simulator and components of system 44 are implemented as individual remote modules connected by a computer network (e.g., the Internet, an intranet). The source code for interface 450 is implemented as a combination of Visual C++ and Visual Basic by Microsoft Corporation of Redmond, Wash. However, other programming languages could also be used to implement the interface 450. The renderer 54 uses Direct3D (Rendermorphics) from Microsoft Corporation of Redmond, Washington to generate each frame. However, other rendering software could also be used. The full system runs at a rate of approximately 5 time units per second, of which the majority of time is spent in the renderer 54.

The VC 50 has proven to be quite robust in the real-time setting of the party simulator without prior information about the events or conversations in the party. There is a good match between the high level control of the actor's actions and the idiom level controls encoded in the VC 50.

Use of the system 44 is very intuitive. The user need not control the camera with the automated camera control in this exemplary embiodiment. The shots and cuts provide a very informative narration of the events. Spectators watching over the shoulder of the user can easily follow the action as well, without knowing the specific commands issued by the user.

The following principles of cinematography are addressed in the VC 50 as follows: camera angles and movement, captured in the camera modules; Don't cross the line, choice of proper instance in camera module; Avoid jump cuts, idiom structure enforces significant changes (or no change) in camera module when changing idiom states; Use establishing shot, hierarchy of idioms; Let the actor lead, action invokes arc transition in idiom; Break movement, idiom arcs transitions conditioned by global T value; Maintain continuous movement, choice of instance in camera module, and idiom arcs transitions; Shot framing, camera module placement, acting hints to reposition actors, and style, the specific idioms and idiom hierarchy designed by a particular director.

By encoding expertise developed by real filmmakers into a hierarchical finite state machine, VC 50 automatically generates camera control for individual shots and sequences these shots as the action unfolds. The results have been shown to be quite robust to the a priori unknown occurrences in the real-time setting of the party simulator. In addition the VC 50 handles the lower level camera modules that deal efficiently with geometrical details; allows a domain-dependent hierarchy of idioms to capture directorial expertise that is simple, robust, and scaleable. The VC 50 also presents acting hints to the renderer 54. The hints include deliberately removing actors to clear the view of the virtual camera; subtly re-arranging the actors; and modifying the scale of performance, according to the screen size of the actor.

The VC 50 is used in virtual reality and other interactive applications to improve upon the fixed point-of-view shots or ceiling mounted virtual cameras that such applications typically employ today. While described primarily with reference to a virtual 3D chat environment, the VC 50 also helps improve the next generation of "intelligent-agent" user interfaces by allowing the users to see themselves with an agent at camera positions that appear natural.

In a virtual 3D chat environment, computer users interact with each other through animated 3D virtual actors (sometimes called avatars) that are controlled by and represent the computer users. The virtual actors are rendered in a display of a 3D room in which the virtual actors are arranged according to which users are communicating with each other. In a similar manner, the VC 50 can provide a "intelligent-agent" user interface in which the intelligent-agent and any underlying computer application or applications are arranged and positioned with respect to each other in a 3D display space.

An intelligent agent is typically a highly interactive user interface device (e.g., a character) used in a variety of contexts, such as providing a user with help or assistance in a software application. In one embodiment, the VC 50 can position the intelligent agent so it does not occlude the application screen for which intelligent agent is assisting or can render. In another embodiment, the human user of the system is assigned a virtual position in the 3D display space which position is also utilized by the VC 50 to form camera views and the resulting displays.

It should be understood that the programs, processes, and methods described herein are not related or limited to any particular type of computer apparatus, unless indicated otherwise. Various types of general purpose or specialized computer apparatus may be used with or perform operations in accordance with the teachings described herein.

In view of the wide variety of embodiments to which the principles of our invention can be applied, it should be understood that the illustrated embodiments are exemplary only, and should not be taken as limiting the scope of our invention.

Rather, we claim as our invention all such embodiments as come within the scope and spirit of the following claims and equivalents thereto.

We claim:

1. A method for displaying virtual cinematography on a display, the method comprising:
   receiving cinematographic events in real time using a real-time application module;
   interpreting the received cinematographic events in real time using ciniematographic logic; and
   automatically producing a camera view specification from the interpreted cinematographic events, where the camera specification is used to view a virtual scene on the display.

2. A computer-readable storage medium having stored therein instructions capable of causing a computer to perform the method of claim 1.

3. The method of claim 1 where the camera view specification includes at least one specification chosen from a set comprising apex, closeapex, apex3, external, 2long, external1to2, exclose2, internal, full, tracking, panning, follow, fixed, raised, group, subjective, subjectzoom, pov, and null camera view specifications.

4. The method of claim 1 where the camera view specification includes selecting camera view distances.

5. The method of claim 4 where the camera view distances include at least one distance chosen from a set comprising an extreme closeup view distance, a view distance, a medium view distance, a full view distance, and a long view distance.

6. The method of claim 1 where the cinematographic logic includes film heuristics for selecting film shots.

7. The method of claim 6 where the film heuristics include at least one heuristic chosen from a set comprising Don't cross the Line, Avoid jump cuts, Use establishing shots, Let the actor lead, Break movement, and Maintain continuous movement.

8. The method of claim 1 where the cinematographic logic includes camera modules and cinematographic idioms implemented as a hierarchical state machine that determines when to switch camera views.

9. The method of claim 1 further comprising adjusting a cinematographic character within a cinematographic event to accord it with the camera view specification.

10. A computer system for implementing virtual cinematography, the system comprising:
   a real-time application module for producing cinematographic events in response to land interfacing with al user input which is received in real time on a computer;

a virtual cinematographic module interpreting the cinematographic events in real time and automatically determining camera position based on the cinematographic events; and a renderer application module for rendering a virtual environment in response to commands from the virtual cinematographic module.

11. The system of claim 10 where the virtual cinematographic module includes camera modules and virtual cinematographic idioms implemented as a hierarchical state machine that decides when to switch camera views.

12. A method for displaying a virtual actor to a user on a computer using virtual cinematography, the method comprising:

displaying a virtual actor on a computer;

automatically selecting a virtual camera view specification;

automatically selecting a virtual camera view distance; and modifying the arrangement and actions of the virtual actor in real time to conform to the selected virtual camera view specification and virtual camera view distance.

13. A computer-readable storage medium having stored therein instructions capable of causing a computer to perform the method of claim 12.

14. The method of claim 12 where the virtual camera specifications include at least one specification chosen from a set comprising apex, closeapex, apex3, external, 2long, external1to2, exclose2, internal, full, tracking, panning, follow, fixed, raised, group, subjective, subjectzoom, pov, and null camera view specifications.

15. The method of claim 12 where the camera view distances include at least one distance chosen from a set comprising extreme closeup view distance, a closeup view distance, a medium view distance, a full view distance, and a long view distance.

16. A method of creating an individual virtual cinematographic idiom for use in a computer system, the method comprising:

defining one or more individual virtual cinematographic idiom states;

selecting a camera module to associate with each defined individual virtual cinematographic idiom state; and defining idiom actions which include transitions between the defined individual virtual cinematographic idiom states;

wherein the idiom actions are used to display a virtual scene in real time on a computer in the computer system.

17. A computer-readable storage medium having stored therein instructions capable of causing a computer to perform the method of claim 16.

18. The method of claim 16 where the camera modules include at least one view chosen from a set comprising apex, closeapex, apex3, external, 2long, external1to2, exclose2, internal, full, tracking, panning, follow, fixed, raised, group, subjective, subjectzoom, pov, and null camera module views.

19. The method of claim 16 where the individual virtual cinematographic idiom actions includes the registration and raising of exceptions.

20. A method of creating a complex virtual cinematographic idiom for use in a computer system to display a virtual scene, the method comprising:

defining one or more complex virtual cinematographic idiom states;

selecting an individual virtual cinematographic idiom for one or more of the defined complex virtual cinematographic idiom states where the individual idiom includes one or more individual idiom states, one or more camera modules and individual idiom actions;

selecting a camera module to associate with each defined virtual cinematographic idiom state;

defining complex idiom actions which include transitions between the defined complex virtual cinematographic idiom states; and defining conditions which are tested to decide which transition occurs;

wherein in the complex virtual cinematographic idiom is used to display a virtual scene in real time on a computer.

21. A computer-readable storage medium having stored therein instructions capable of causing a computer to perform the method of claim 20.

22. A method of creating high level virtual cinematographic idioms for use in a computer system to display a virtual scene, the method comprising:

selecting a first set of individual virtual cinematographic idioms, where each of the individual virtual cinematographic idioms includes individual virtual cinematographic idiom states, camera modules, and virtual cinematographic individual idiom actions;

combining the first set of individual virtual cinematographic idioms to create a complex virtual cinematographic idiom, where the complex virtual cinematographic idiom includes complex virtual cinematographic idiom states, camera modules, and complex virtual cinematographic idiom actions;

selecting a second set of individual virtual cinematographic idioms and the complex virtual cinematographic idiom; and combining the second set of individual virtual cinematographic idioms and the complex virtual cinematographic idiom to create a high level virtual cinematographic idiom;

wherein the high-level virtual cinematographic idioms are used to display a virtual scene in a real-time computer.

23. A computer-readable storage medium having stored therein instructions capable of causing a computer to perform the method of claim 22.

24. The method of claim 22 where the high level virtual cinematographic idiom is a verb virtual cinematographic idiom.

25. A computer-readable storage medium having stored thereon instructions causing a computer to perform a method comprising:

selecting a set of verb virtual cinematographic idioms by identifying at least a verb and an object for each verb virtual cinematographic idiom;

combining the selected set of verb virtual cinematographic idioms to create a pluralities of virtual movie scenes; and combining selected ones of the virtual movie scenes to create a virtual movie.

26. A computer-readable storage medium having stored therein instructions capable of causing a computer to perform the method of claim 25.

27. A method of virtual directing for display of a virtual scene on a computer display, the method comprising:

selecting a set of virtual cinematographic idioms, an idiom being a hierarchical state machine that automatically determines how camera viewing directions transition from one shot to another, where the virtual cinematographic idioms include one or more virtual cinematographic idiom states, one or more camera modules and individual idiom actions;

changing the camera modules within the virtual cinematographic idioms based on a specific film directing style to create a customized, modified set of virtual cinematographic idioms;

combining the modified set virtual cinematographic idioms based on the specific film directing style to create a pluralities of virtual movie scenes; and combining selected ones of the virtual movie scenes to create a virtual movie for display on the computer display.

28. A computer-readable storage medium having stored therein instructions capable of causing a computer to perform the method of claim 27.

29. A system for displaying a virtual scene on a client computer, comprising:

a real-time application module that receives user input from a user on the client computer to control, in real-time, a virtual actor displayed on the client computer as seen from a virtual camera;

a real-time camera controller that includes a hierarchical finite state machine and a plurality of camera modules, the state machine for determining the positioning of the virtual camera and for determining display information for the virtual actor by invoking one of the camera modules; and a renderer for rendering the virtual actor using camera position information and display information from the real-time controller.

30. The system of claim 29 wherein a user can control the virtual actor through a user input device.

31. The system of claim 30 further including a plurality of client computers connected to a network, wherein the first mentioned client computer is connected to the network and wherein at least two client computers each have a virtual actor in the virtual scene wherein each virtual actor is separately controlled by its associated client computer.

* * * * *

UNITED STATES PATENT AND TRADEMARK OFFICE
CERTIFICATE OF CORRECTION

PATENT NO.    : 6,040,841

DATED         : March 21, 2000

INVENTOR(S)   : Cohen et al.

It is certified that errors appear in the above-identified patent and that said Letters Patent is hereby corrected as shown below:

| Col./Line | Error Reads | Should Read |
|---|---|---|
| 10/16 | macxdist | maxdist |
| 11/42 | walling | walking |
| 12/49 | 5 which | which |
| 13/14 | actions> | <actions> |
| 19/31 | Cidle, | (idle, |
| 19/63 | variablesforwardedge | variables forwardedge |
| 20/6 | whetherforwardedge | whether forwardedge |
| 20/16 | party The party | party. The party |
| 22/47 | a view distance | a closeup view distance |
| 22/66 | to land interfacing with al user | to user |

Signed and Sealed this

Tenth Day of April, 2001

Attest:

NICHOLAS P. GODICI

Attesting Officer        Acting Director of the United States Patent and Trademark Office